United States Patent
Theriault et al.

(10) Patent No.: US 9,552,737 B1
(45) Date of Patent: Jan. 24, 2017

(54) LANDING DISTANCE INDICATOR GENERATING SYSTEM, DEVICE, AND METHOD

(71) Applicant: Rockwell Collins, Inc., Cedar Rapids, IA (US)

(72) Inventors: Ricky J. Theriault, King City, OR (US); Keith A. Stover, Lisbon, IA (US); Eric N. Anderson, Cedar Rapids, IA (US); Travis S. VanDerKamp, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 106 days.

(21) Appl. No.: 14/725,100

(22) Filed: May 29, 2015

(51) Int. Cl.
*G08B 23/00* (2006.01)
*G08G 5/02* (2006.01)
*G08G 5/00* (2006.01)

(52) U.S. Cl.
CPC .............. *G08G 5/02* (2013.01); *G08G 5/0047* (2013.01)

(58) Field of Classification Search
CPC ............. G08G 5/92; G08B 21/00; B64F 1/18; G06F 19/00
USPC .... 340/963, 965, 972–976, 946; 701/15, 16, 701/18
See application file for complete search history.

(56) References Cited

U.S. PATENT DOCUMENTS

| | | | |
|---|---|---|---|
| 4,343,037 A | 8/1982 | Bolton | |
| 4,454,496 A | 6/1984 | Lowe | |
| 5,218,360 A | 6/1993 | Goetz et al. | |
| 5,289,185 A | 2/1994 | Ramier et al. | |
| 5,654,890 A | 8/1997 | Nicosia et al. | |
| 6,700,482 B2 | 3/2004 | Ververs et al. | |
| 6,711,479 B1 | 3/2004 | Staggs | |
| 6,720,891 B2 | 4/2004 | Chen et al. | |
| 6,822,624 B2 | 11/2004 | Naimer et al. | |
| 6,995,690 B1 | 2/2006 | Chen et al. | |
| 7,463,954 B1 | 12/2008 | He | |
| 7,486,291 B2 | 2/2009 | Berson et al. | |
| 7,564,372 B1 | 7/2009 | Bailey et al. | |
| 7,714,744 B1 | 5/2010 | Wichgers | |
| 8,010,245 B2 | 8/2011 | Nichols et al. | |
| 8,155,806 B2 * | 4/2012 | Suddreth | G01C 23/00 701/14 |
| 8,810,435 B2 * | 8/2014 | He | G05D 1/102 340/946 |
| 9,129,521 B2 * | 9/2015 | Gannon | G08G 5/0047 |
| 9,245,450 B1 * | 1/2016 | Chiew | G05D 1/0676 |
| 2003/0132860 A1 | 7/2003 | Feyereisen et al. | |

(Continued)

*Primary Examiner* — Tai T Nguyen
(74) *Attorney, Agent, or Firm* — Daniel M. Barbieri; Donna P. Suchy; Angel N. Gerdzhikov

(57) ABSTRACT

A system, device, and method for generating a landing distance indicator (LDI) are disclosed. The LDI generating system may include one or more sources of navigation data, one or more sources of landing distance (LD) factor data, published LD data source, an image generator (IG), and a presentation system. The IG may be configured to navigation data; acquire LD factor data; define LD data; and generate image data as a function of the navigation data and the LD data. The navigation data could include a runway reference point, and the LD data could an LD. The image data could be representative of at least an image of an LDI comprised of a first boundary is based upon a location of the runway reference point, and a second boundary is based upon the runway reference point and the landing distance.

20 Claims, 37 Drawing Sheets

(56) References Cited

U.S. PATENT DOCUMENTS

| | | |
|---|---|---|
| 2004/0162648 A1 | 8/2004 | Bontrager et al. |
| 2006/0250280 A1 | 11/2006 | Chen et al. |
| 2007/0048084 A1 | 3/2007 | Jung et al. |
| 2008/0162092 A1 | 7/2008 | Coulmeau et al. |
| 2008/0252489 A1 | 10/2008 | Naimer et al. |
| 2008/0300735 A1 | 12/2008 | He |
| 2008/0300741 A1 | 12/2008 | Constans |
| 2010/0082187 A1 | 4/2010 | Nichols et al. |

* cited by examiner

Normal Configuration Landing Distance
Flaps 30
Dry Runway

| | | | | LANDING DISTANCES AND ADJUSTMENTS (M) | | | | | | | | |
|---|---|---|---|---|---|---|---|---|---|---|---|---|
| | REF DIST* | WT ADJ | ALT ADJ | WIND ADJ PER 10 KTS | | SLOPE ADJ PER 1% | | TEMP ADJ PER 10°C | | APP SPD ADJ | REVERSE THRUST ADJ | |
| BRAKING CONFIGURATION | 190000 KG LANDING WT | PER 5000 KG ABV/BLW 190000 KG | PER 1000 FT ABV S.L. | HEAD WIND | TAIL WIND | DN HILL | UP HILL | ABV ISA | BLW ISA | PER 10 KTS ABV VREF30 | ONE REV | NO REV |
| MAX MANUAL | 890 | +20/0 | 10 | -35 | 125 | 10 | -10 | 20 | -20 | 65 | 20 | 45 |
| MAX AUTO | 1210 | +25/0 | 10 | -50 | 180 | 0 | 0 | 30 | -30 | 125 | 0 | 0 |
| AUTOBRAKE 4 | 1565 | +30/0 | 15 | -75 | 255 | 5 | -5 | 40 | -40 | 170 | 10 | 10 |
| AUTOBRAKE 3 | 1845 | +40/-20 | 25 | -90 | 310 | 15 | -35 | 50 | -50 | 140 | 45 | 50 |
| AUTOBRAKE 2 | 2025 | +45/-25 | 35 | -100 | 350 | 45 | -50 | 50 | -55 | 135 | 165 | 175 |
| AUTOBRAKE 1 | 2180 | +55/-30 | 45 | -115 | 400 | 65 | -60 | 55 | -55 | 135 | 290 | 440 |

Good Reported Braking Action

| | | | | | | | | | | | | |
|---|---|---|---|---|---|---|---|---|---|---|---|---|
| MAX MANUAL | 1220 | +25/-10 | 20 | -60 | 215 | 30 | -25 | 30 | -30 | 90 | 85 | 205 |
| MAX AUTO | 1330 | +25/0 | 15 | -60 | 215 | 15 | -10 | 30 | -30 | 125 | 80 | 210 |
| AUTOBRAKE 4 | 1570 | +30/0 | 15 | -75 | 260 | 10 | -5 | 40 | -40 | 170 | 15 | 45 |
| AUTOBRAKE 3 | 1845 | +40/-20 | 25 | -90 | 310 | 15 | -35 | 50 | -50 | 140 | 45 | 50 |
| AUTOBRAKE 2 | 2025 | +45/-25 | 35 | -100 | 350 | 45 | -50 | 50 | -55 | 135 | 165 | 175 |
| AUTOBRAKE 1 | 2180 | +55/-30 | 45 | -115 | 400 | 65 | -60 | 55 | -55 | 135 | 290 | 440 |

Medium Reported Braking Action

| | | | | | | | | | | | | |
|---|---|---|---|---|---|---|---|---|---|---|---|---|
| MAX MANUAL | 1585 | +40/-15 | 30 | -90 | 340 | 65 | -55 | 40 | -40 | 110 | 215 | 590 |
| MAX AUTO | 1665 | +40/-15 | 30 | -90 | 335 | 65 | -45 | 40 | -40 | 125 | 210 | 585 |
| AUTOBRAKE 4 | 1730 | +40/-5 | 25 | -95 | 350 | 40 | -30 | 45 | -45 | 170 | 155 | 550 |
| AUTOBRAKE 3 | 1905 | +45/-20 | 25 | -100 | 375 | 45 | -50 | 50 | -50 | 140 | 115 | 410 |
| AUTOBRAKE 2 | 2055 | +50/-25 | 40 | -105 | 390 | 70 | -55 | 55 | -55 | 135 | 210 | 410 |
| AUTOBRAKE 1 | 2185 | +55/-30 | 45 | -115 | 410 | 80 | -55 | 55 | -55 | 135 | 315 | 550 |

Poor Reported Braking Action

| | | | | | | | | | | | | |
|---|---|---|---|---|---|---|---|---|---|---|---|---|
| MAX MANUAL | 1955 | +50/-25 | 45 | -130 | 515 | 140 | -95 | 55 | -55 | 125 | 435 | 1410 |
| MAX AUTO | 2060 | +50/-25 | 45 | -130 | 510 | 140 | -95 | 55 | -55 | 125 | 435 | 1415 |
| AUTOBRAKE 4 | 2060 | +55/-20 | 45 | -130 | 510 | 135 | -80 | 55 | -55 | 160 | 440 | 1415 |
| AUTOBRAKE 3 | 2140 | +55/-30 | 40 | -135 | 520 | 120 | -95 | 60 | -60 | 140 | 360 | 1350 |
| AUTOBRAKE 2 | 2225 | +55/-30 | 50 | -135 | 530 | 140 | -100 | 60 | -60 | 135 | 405 | 1310 |
| AUTOBRAKE 1 | 2300 | +60/-35 | 55 | -140 | 540 | 150 | -105 | 60 | -60 | 135 | 460 | 1320 |

FIG. 2A

Non-Normal Configuration Landing Distance
Dry Runway

| | | LANDING DISTANCES AND ADJUSTMENTS (M) | | | | | | | |
|---|---|---|---|---|---|---|---|---|---|
| | | REF DIST | WT ADJ | ALT ADJ | WIND ADJ PER 10 KTS | SLOPE ADJ PER 1% | TEMP ADJ PER 10°C | APP SPD ADJ | REVERSE THRUST ADJ | |
| EICAS MESSAGE | VREF | 190000 KG FDG WT | PER 5000 KG ABV/BLW 190000 KG | PER 1000 FT ABV S.L. | HEAD/ TAIL WIND | DOWN/ UP HILL | ABV/ BLW ISA | PER 10 KTS ABV VREF | ONE REV | NO REV |
| ANTISKID (FLAPS 25) | VREF25 | 1625 | 35/-15 | 45 | -90/340 | 65/-55 | 40/-45 | 115 | 220 | 620 |
| ANTISKID (FLAPS 30) | VREF30 | 1615 | 35/-15 | 30 | -90/340 | 65/-55 | 40/-40 | 110 | 215 | 590 |
| ENG SHUTDOWN L, R (FLAPS 20) | VREF20 | 930 | 25/-5 | 20 | -35/125 | 10/-10 | 20/-20 | 70 | - | 45 |
| ENG SHUTDOWN L, R (FLAPS 30) | VREF30 | 905 | 20/0 | 10 | -35/125 | 10/-10 | 20/-20 | 70 | - | 40 |
| FLAPS DRIVE (FLAPS ≤ 5) | VREF30+40 | 1125 | 40/-5 | 15 | -40/140 | 10/-10 | 25/-25 | 65 | 35 | 80 |
| FLAPS DRIVE (5 < FLAPS < 20) | VREF30+20 | 1035 | 30/-5 | 15 | -40/135 | 10/-10 | 25/-25 | 70 | 30 | 70 |
| FLAPS DRIVE (FLAPS ≥ 20) | VREF20 | 925 | 25/-5 | 20 | -35/125 | 10/-10 | 20/-20 | 70 | 20 | 50 |
| FLAPS PRIMARY FAIL | VREF20 | 1055 | 25/-5 | 25 | -40/140 | 15/-10 | 20/-25 | 90 | 30 | 65 |
| FLAP/SLAT CONTROL | VREF20 | 925 | 25/-5 | 20 | -35/125 | 10/-10 | 20/-20 | 70 | 20 | 50 |
| FLIGHT CONTROL MODE | VREF20 | 1065 | 25/-5 | 25 | -40/140 | 15/-10 | 25/-25 | 90 | 30 | 70 |
| HYD PRESS SYS C | VREF20 | 1055 | 25/-5 | 25 | -40/140 | 15/-10 | 20/-25 | 90 | 30 | 65 |
| HYD PRESS SYS L+C | VREF30+20 | 1320 | 25/0 | 15 | -50/165 | 20/-20 | 30/-30 | 125 | - | 65 |
| HYD PRESS SYS L+R | VREF30+20 | 1425 | 25/5 | 15 | -60/195 | 35/-30 | 35/-35 | 140 | - | - |
| HYD PRESS SYS R+C | VREF30+20 | 1610 | 25/0 | 20 | -65/225 | 40/-35 | 40/-40 | 155 | - | 150 |
| HYD PRESS SYS L (FLAPS 25) | VREF25 | 965 | 20/0 | 20 | -40/135 | 15/-10 | 20/-20 | 85 | - | 30 |
| HYD PRESS SYS L (FLAPS 30) | VREF30 | 975 | 20/0 | 10 | -40/135 | 15/-10 | 20/-20 | 85 | - | 35 |
| HYD PRESS SYS R (FLAPS 25) | VREF25 | 1055 | 15/0 | 20 | -45/155 | 20/-15 | 25/-25 | 95 | - | 50 |

FIG. 2B

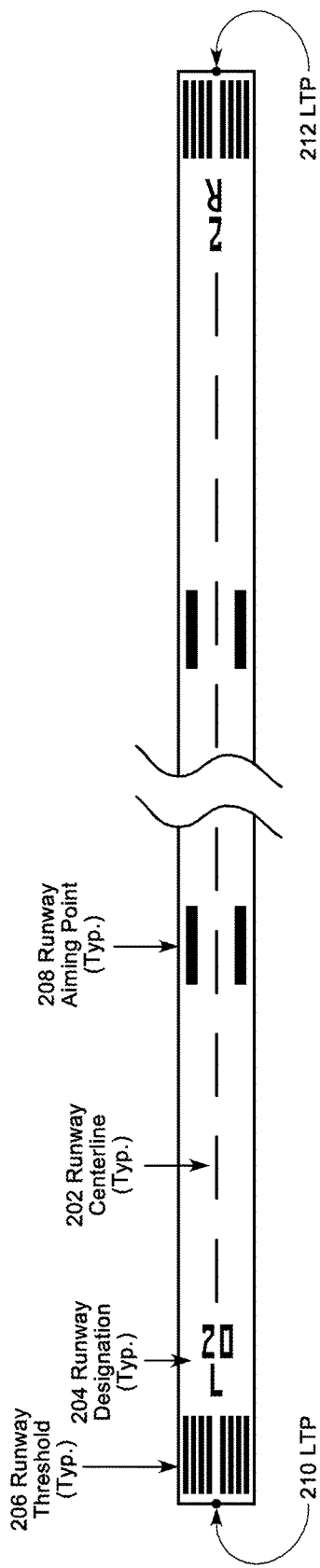
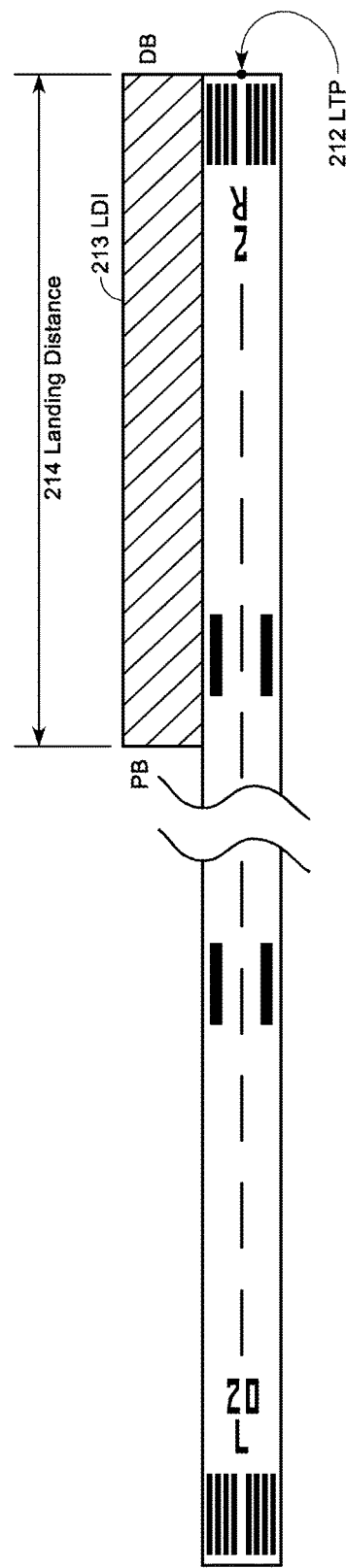
FIG. 4A
FIG. 4B

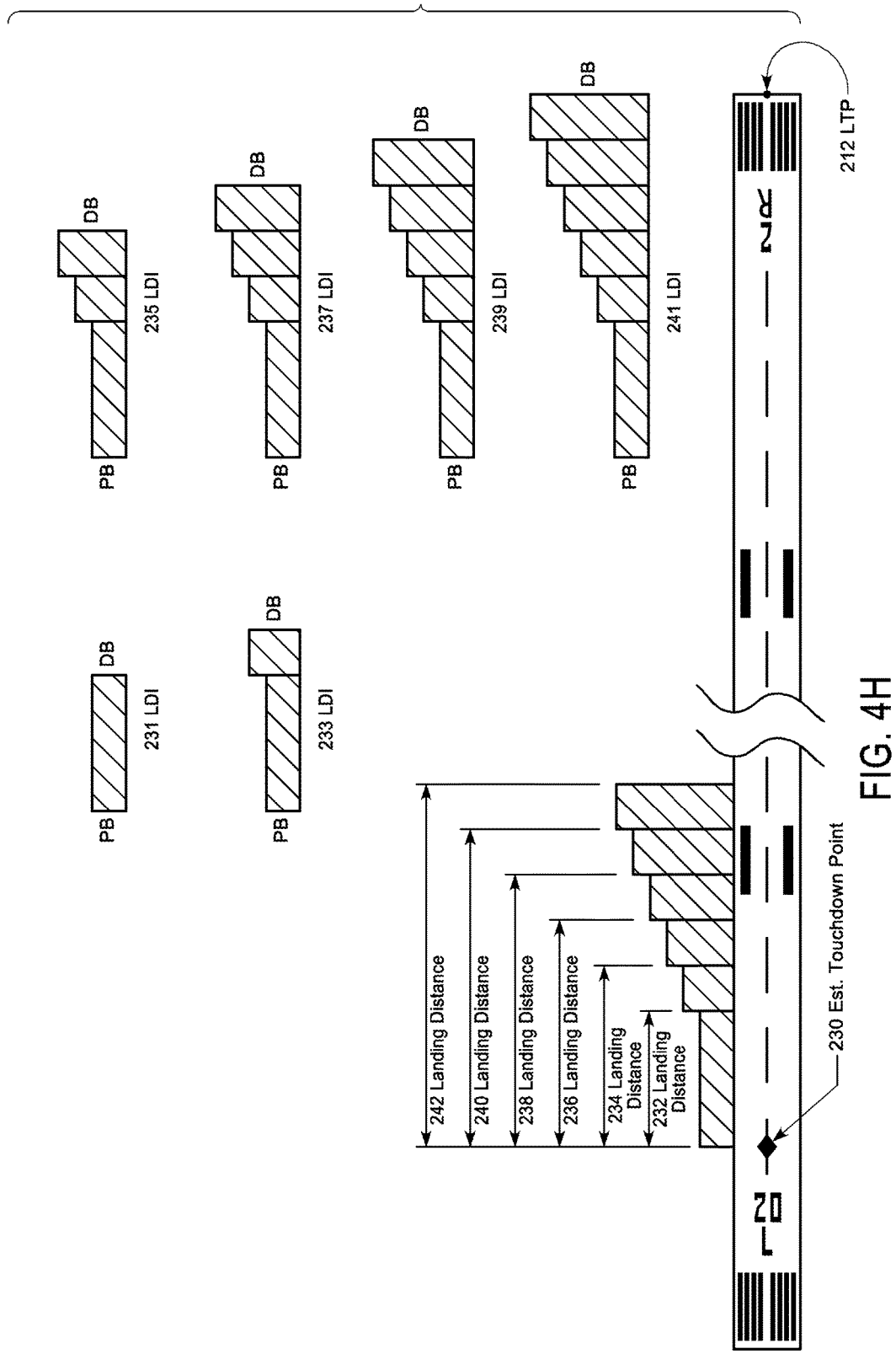

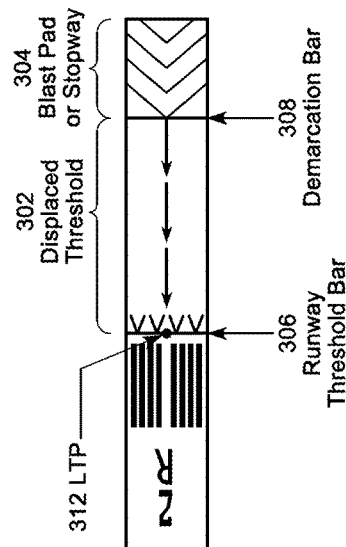
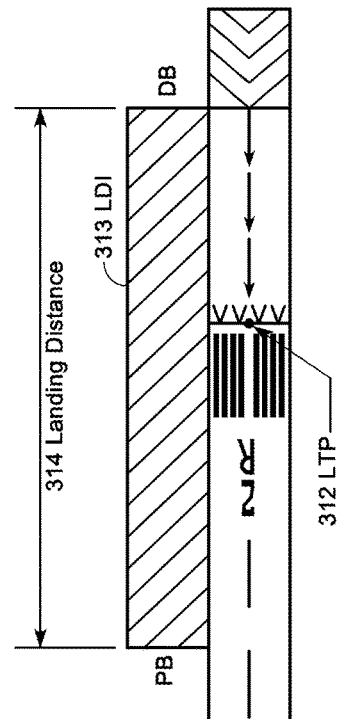
FIG. 5A
FIG. 5B

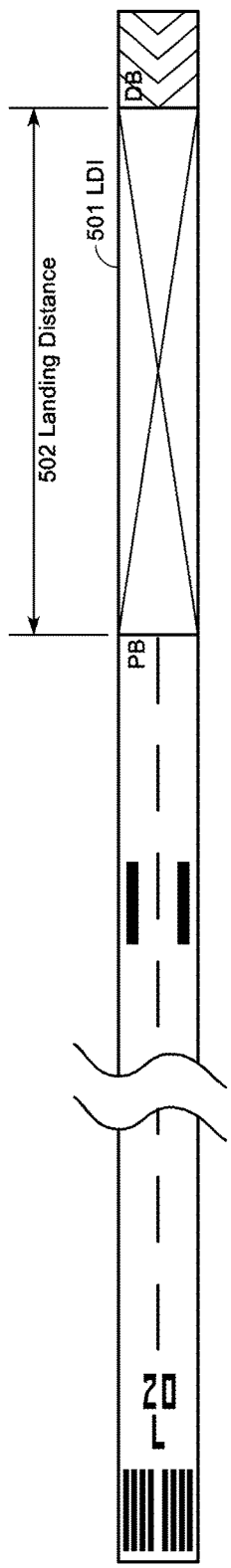

LANDING DISTANCE INDICATOR GENERATING SYSTEM, DEVICE, AND METHOD

BACKGROUND

Field of the Inventive Concepts

The inventive concepts disclosed herein pertain generally to the field of aircraft display units that present information to the pilot of an aircraft.

Description of the Related Art

Long landings and subsequent runway overruns have been a safety concern in aviation and an area of recent attention. This issued was discussed in a March 2012 article published by Boeing, Inc. and entitled "Reducing Runway Landing Overruns." Using Boeing event data analyzed collectively from 2003 to 2010, Boeing has recognized numerous contributors to runway overruns: sixty-eight percent occurred after stable approaches, fifty-five percent touched down within the touchdown zone, ninety percent landed on an other-than-dry runway, and forty-two percent landed with a tailwind of five knots or greater. During an approach-to-touchdown phase, contributors include tailwinds and approaches that are too high or too fast; during a touchdown phase, contributors include long landings and high touchdown speeds; and during a deceleration phase, contributors include thrust reverser levels that are too low or have been reduced too soon, limited surface friction or runway contamination, thrust reversers that have been deployed too late or not deployed at all, speed brakes that have been deployed too late or not deployed at all, and low auto brake settings.

Boeing recommended that airlines consider modifying their approach and landing procedures to incorporate runway safety recommendations. These include calculating the required amount of runway length using real-time information, calculating a landing distance (LD) using real-time aircraft and actual runway data, determining a go-around point, and adding a thrust reverser callout. In addition, Boeing discussed new safety technologies targeted at runway overrun prevention through approach planning, approach, touchdown, and deceleration. During approach planning, flight deck tools and procedures assist the flight crew in determining the required runway length and where on the runway the aircraft is expected to stop given certain conditions. In fact, Boeing offers an LD calculator on electronic flight bags, augmenting this existing technology by adding a more effective way to display this information to the flight crew. By graphically depicting a dry and contaminated stopping location during approach planning, the flight crew can assess its risk of runway overrun before touchdown and possess an option of manually entering a reference line that could be a land and hold short line operation, a taxiway exit, or a desired touchdown or go-around point.

Advanced flight deck enhancements have been developed for the head-up display, vertical situation display, onboard performance tools and runway awareness and advisory systems. Encouraged by the aviation community, enhancements continue to be developed to improve the flight crew's situational awareness during the approach, touchdown, and deceleration phase of flight.

SUMMARY

Embodiments of the inventive concepts disclosed herein are directed to a system, device, and method for generating an aircraft LDI that presents an LD. The LDI could be used to enhance a pilot's situational awareness of a runway environment by providing an LDI, the size of which is dependent upon the LD.

In one aspect, embodiments of the inventive concepts disclosed herein are directed to a system for generating an aircraft LDI. The aircraft LDI generating system may include one or more sources of navigation data, one or more sources of LD factor data, and an image generator (IG). In some embodiments, the aircraft LDI generating system may include a published LD data source and/or a presentation system.

In a further aspect, embodiments of the inventive concepts disclosed herein are directed to a device for generating an aircraft LDI. The device may include the IG and may be configured (or programmed) to perform a method of generating an aircraft LDI presentable to a viewer.

In a further aspect, embodiments of the inventive concepts disclosed herein are directed to a method for generating an aircraft LDI. When properly configured, the IG may acquire navigation data, acquire LD factor data, define LD data, and generate image data as a function of the navigation data and the LD data. The navigation data could include a runway reference point, and the LD data could an LD. In some embodiments, the IG may acquire published LD data from which LD data is defined.

BRIEF DESCRIPTION OF THE DRAWINGS

FIG. 2A depicts an exemplary illustration of a table of LDs.

FIG. 2B depicts an exemplary illustration of a second table of LDs.

FIG. 4A depicts an exemplary illustration of a runway and runway markings.

FIG. 4B depicts an exemplary illustration of an LDI shown in a plan view.

FIG. 4H depicts third exemplary illustrations of multiple configurations of an LDI.

FIG. 5A depicts an exemplary illustration of a runway, displaced threshold, and runway and displaced threshold markings.

FIG. 5B depicts an exemplary illustration of an LDI shown in a plan view of a runway with a displaced threshold.

FIG. 7A depicts an exemplary illustration of an LDI shown in a plan view and located on the surface of a runway with a displaced threshold.

DETAILED DESCRIPTION

In the following description, several specific details are presented to provide a thorough understanding of embodiments of the inventive concepts disclosed herein. One skilled in the relevant art will recognize, however, that the inventive concepts disclosed herein can be practiced without one or more of the specific details or in combination with other components. In other instances, well-known implementations or operations are not shown or described in detail to avoid obscuring aspects of various embodiments of the inventive concepts disclosed herein.

Figure 1:
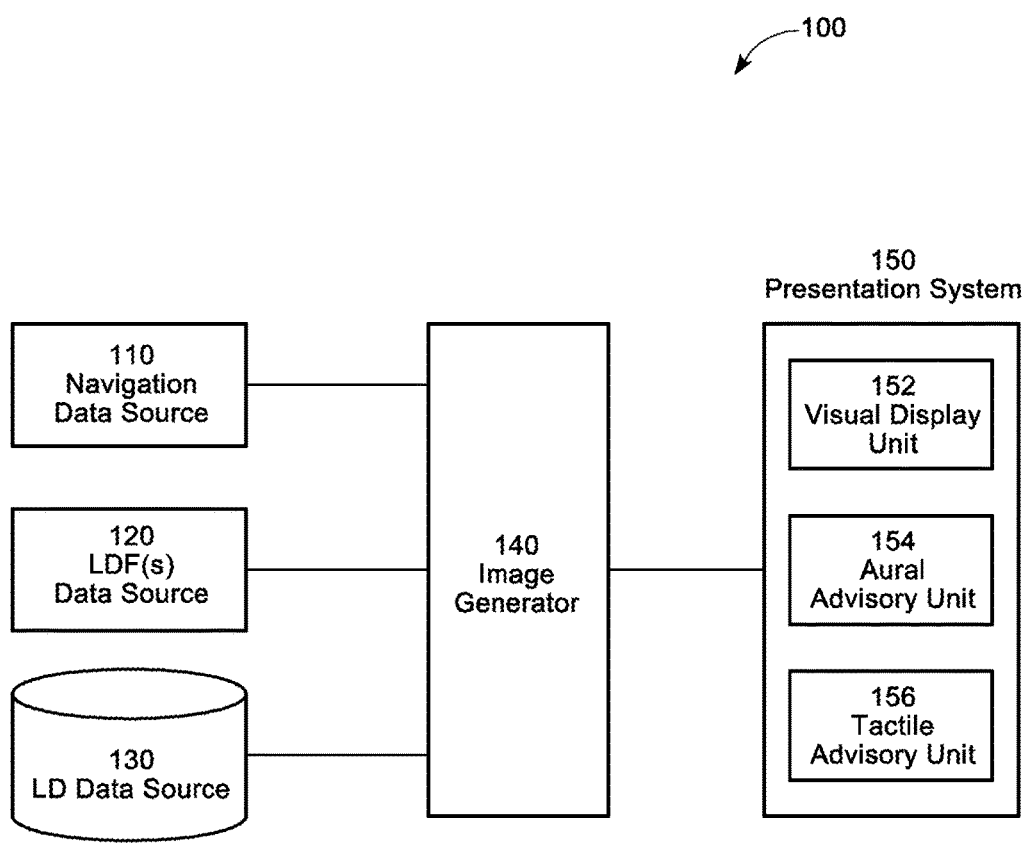
FIG. 1 depicts a block diagram of a system for generating an aircraft LDI.

FIG. 1 depicts a functional block diagram of an embodiment of a landing distance (LD) indicator generating system 100 suitable for implementation of the techniques described herein. The functional blocks of the system 100 include a navigation data source 110, a landing distance factors (LDFs) data source 120, an LD data source 130, an image generator (IG) 140, and a presentation system 150.

The navigation data source 110 could include any source(s) which provides navigation data information in an aircraft. The navigation data source 110 may include, but is not limited to, an air/data system, an attitude heading reference system, an inertial guidance system (or inertial reference system), and a global navigation satellite system (or satellite navigation system), all of which are known to those skilled in the art. The navigation data source 110 could provide navigation data including, but not limited to, geographic position, altitude, heading, attitude, ground speed, air speed, and/or time. Aircraft position may be comprised of geographic position (e.g., latitude and longitude coordinates) and altitude, and ground track may be derived from either geographic position, aircraft position, or both. Aircraft orientation may be comprised of pitch, roll, and/or yaw information related to the attitude of the aircraft.

The navigation data source 110 could further include a flight management system (FMS) which could perform a variety of functions to help the crew in the management of the flight. These functions could include receiving a flight plan (i.e., planned trajectory) and constructing a lateral and vertical flight plan (i.e., planned lateral and vertical trajectories) from the flight plan. The flight plan could be comprised of a series of waypoints, where each waypoint could include an altitude constraint associated with it. A pilot could create a flight plan by entering waypoints stored in a database or select a flight plan stored in a database of the FMS. In some embodiments, the flight plan could be received and loaded into the FMS automatically through a data link system.

In the performance of its many functions, the FMS could compute a variety of distances and/or surface lengths. Further, distances and/or lengths could be computed by the pilot and entered into the FMS in some embodiments. The FMS may perform a variety of functions to help the crew in the management of the flight. In the performance of its many functions, the FMS may receive navigation data from the navigation data source 110 such as those discussed above.

Typically, an FMS is comprised of a navigation database that stores data associated with a flight plan such as, but not limited to, published instrument approach procedures, ground-based navigational aids, waypoints, holding patterns, airways, airports, heliports, instrument departure procedures, instrument arrival procedures, runways, precision approach aids, company routes, airport communications, localizer and airway markers, special use airspace, airport sector altitudes, enroute airways restrictions, enroute communications, preferred routes, controlled airspace, geographical references, arrival and/or departure flight planning, path point records, and global navigation satellite system landing systems. With respect to runway data, information regarding the location and elevation of a runway's landing threshold point, runway length, and runway width is stored. The navigation database employed by the FMS could be a database described in the following document published by Aeronautical Radio, Incorporated ("ARINC"): ARINC Specification 424 entitled "Navigations Systems Data Base"

("ARINC 424"), an aviation industry standard known to those skilled in the art and which is incorporated by reference herein in its entirety.

It should be noted that, in some embodiments for any source or system in an aircraft including the navigation data source 110, data could be comprised of any analog or digital signal, either discrete or continuous, which could contain information or be indicative of information. In some embodiments, aircraft could mean any vehicle which is able to fly through the air or atmosphere including, but not limited to, lighter than air vehicles and heavier than air vehicles, wherein the latter may include manned or unmanned fixed-wing and rotary-wing vehicles.

The LDFs data source 120 could include any source or combination of sources—including the navigation data source 110—that could provide data representative at least one landing distance factor (LDF) identified by an aircraft manufacturer that may affect landing distances of an aircraft under normal and non-normal landing configurations. For example, the LDFs data source 120 could be comprised of one or more aircraft systems or components thereof. The LDFs data source 120 could include real-time system or sensor data, signal input from a plurality of aircraft systems or sensors, and information from any database or source. Detailed discussions of the LDFs and the employment thereof have been disclosed (and discussed as input factors) by Chiew et al in U.S. Pat. No. 9,245,450 entitled "System, Apparatus, and Method for Generating Runway Visual Aids on an Aircraft Display Unit," which is incorporated herein by reference in its entirety.

The LDFs data source 120 could include a manual input device for facilitating a manual input of data representative of information related to one or more LDFs; the pilot input devices could include, but are not limited to, a tactile device (e.g., keyboard, control display unit, cursor control device, stylus, electronic grease pen, handheld device, touch screen device, notebook, tablet, electronic flight bag, etc. . . . ) and/or speech recognition systems. In some embodiments, the LDFs data source 120 could be configured to provide LDFs data to the IG 140 for subsequent processing as discussed herein.

The LD data source 130 could include any source—including the navigation data source 110—configured with predefined data representative of a plurality of LDs and/or LD adjustments for normal and non-normal landing configurations. Tables of landing distances that may be published by an aircraft manufacturer in an aircraft operating manual are illustrated in FIGS. 2A and 2B. Referring now to FIG. 2A, landing distances and adjustments in meters (M) for a landing configuration that has been defined as "normal" by a manufacturer and/or end-user for a hypothetical aircraft are shown in tables, where each table corresponds to an unreported braking condition or three levels of reported braking conditions when the flaps set to 30 degrees for landing. As shown for the purpose of illustration, there is a non-exhaustive list of a plurality of LDFs that could include runway condition, reported braking conditions, flaps setting, autobrake settings, aircraft weight, altitude, wind, runway slope, temperature, speed, and availability of thrust reverser(s). As indicated, there are six possible brake settings selectable by the pilot for the hypothetical aircraft.

Referring now to FIG. 2B, landing distances and adjustments for a landing configuration that has been defined as "non-normal" by a manufacturer and/or end-user for a hypothetical aircraft are shown in a table. As shown for the purpose of illustration, a plurality of LDFs shown in FIG. 2A are included in FIG. 2B. In addition, LDFs of FIG. 2B include message(s) associated with an Engine Indicating and Crew Alerting System (EICAS), an integrated aircraft system known to those skilled in the art which could integrate inputs from various aircraft systems and present instrumentation and crew annunciations; for the purpose of illustration, FIG. 2B illustrates a table of landing distances and adjustments for a small, hypothetical sample of potential listing EICAS messages.

The IG 140 could include any electronic data processing unit which executes software or computer instruction code that could be stored, permanently or temporarily, in a digital memory storage device or a non-transitory computer-readable media including, but not limited to, random access memory (RAM), read-only memory (ROM), compact disc (CD), hard disk drive, diskette, solid-state memory, Personal Computer Memory Card International Association card (PC-MCIA card), secure digital cards, and compact flash cards. The IG 140 may be driven by the execution of software or computer instruction code containing algorithms developed for the specific functions embodied herein. The IG 140 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the IG 140 could also consist of more than one electronic data processing unit. In some embodiments, the IG 140 could be a processor(s) used by or in conjunction with any other system of the aircraft including, but not limited to, the navigation data source 110, the LDFs data source 120, the LD data source 130, and the presentation system 150.

In some embodiments, the terms "programmed" and "configured" are synonymous. The IG 140 may be electronically coupled to systems and/or sources to facilitate the receipt of input data. In some embodiments, operatively coupled may be considered as interchangeable with electronically coupled. It is not necessary that a direct connection be made; instead, such receipt of input data and the providing of output data could be provided through a data bus, through a wireless network, or as a signal received and/or transmitted by the IG 140 via a physical or a virtual computer port. The IG 140 may be programmed or configured to execute the method discussed in detail below. The IG 140 may be programmed or configured to provide output data to various systems and/or units including, but not limited to, the presentation system 150.

The presentation system 150 could be comprised of any unit of which visual, aural, and/or tactile indications may be presented to the pilot including, but not limited to, a visual display unit(s) 152, an aural advisory unit 154, and/or a tactile advisory unit 156. The visual display unit 152 could be comprised of any unit of which information may be presented visually to the pilot. The visual display unit 152 could be part of an Electronic Flight Information System (EFIS) and could be comprised of, but is not limited to, a Primary Flight Display (PFD), Navigation Display (ND), Head-Up Display (HUD), Head-Down Display (HDD), Multi-Purpose Control Display Unit, EICAS, Electronic Centralized Aircraft Monitor, Multi-Function Display, Side Displays, Electronic Flight Bags, Portable Electronic Devices (e.g., laptops, smartphones, tablets, and/or user-wearable devices such as head mounted devices).

The visual display unit 152 could be capable of projecting and/or presenting an LD indicator (LDI). LDIs may be presented graphically with or without textual information as disclosed below. LDIs may include alerts and/or non-alert(s). Alerts may be based on level of threat or conditions requiring immediate crew awareness or attention. Caution alerts may be alerts requiring immediate crew awareness in which subsequent corrective action will normally be necessary. Warning alerts may be alerts requiring immediate crew action. In some embodiments, both caution and warning alerts may be presented in combination with or simultaneous to aural advisories and/or tactile advisories. Non-alerts may be any other information not requiring immediate crew attention or awareness. Alerts may be presented visually by depicting one or more colors and may be presented on a display unit indicating one or more levels of threat. For the purpose of illustration and not limitation, amber or yellow may indicate a caution alert, red may indicate a warning alert, and green or cyan may indicate a non-alert.

The aural advisory unit 154 may be any unit capable of producing aural advisories. Aural advisories may be discrete sounds, tones, and/or verbal statements used to annunciate a condition, situation, or event. Examples of aural advisories and the employment thereof have been disclosed in the Chiew reference. In some embodiments, aural advisories could be presented in combination with or simultaneous to visual alerts and/or tactile advisories.

The tactile advisory unit 156 may be any unit capable of producing tactile advisories. Tactile advisories may be any tactile stimulus to present a condition, situation, or event to the pilot such as, but not limited to, a warning alert and/or a caution alert. Examples of tactile stimuli include a "stick shaker" and a vibrating seat (e.g., a pilot's seat outfitted with a vibrating device). Moreover, tactile advisories could be presented in combination with or simultaneous to visual alerts and/or aural advisories. In some embodiments, one or more units of the presentation system 150 may receive presentation data provided by IG 140.

The visual display unit 152 may be configured to present one or more display(s) or image(s). In some embodiments, the terms "display" and "image" are interchangeable and treated synonymously.

Figure 3A:
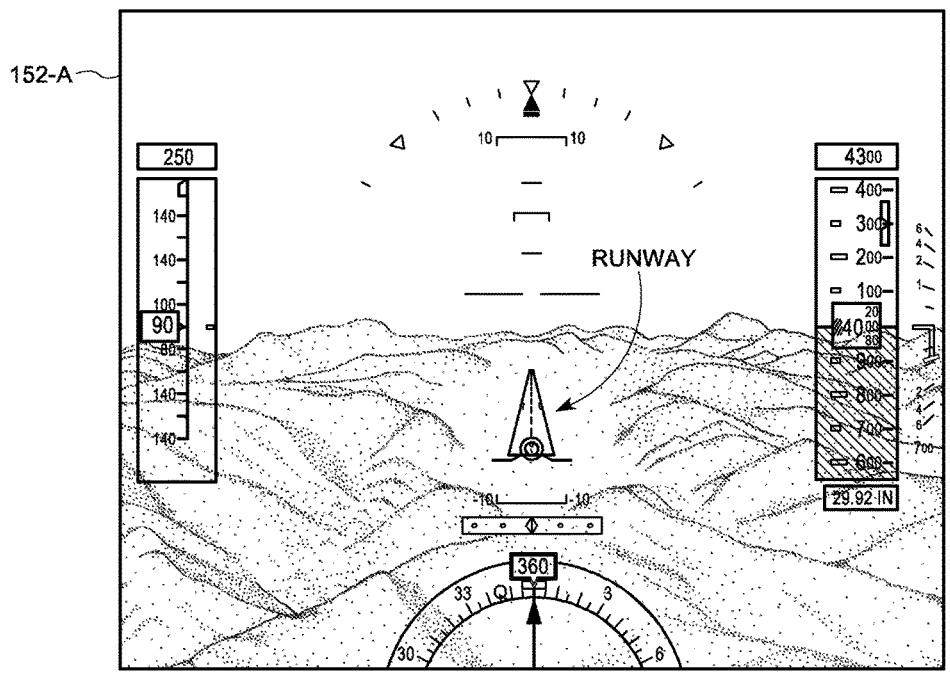
FIG. 3A depicts an exemplary illustration of a head-down display unit.
Figure 3B:
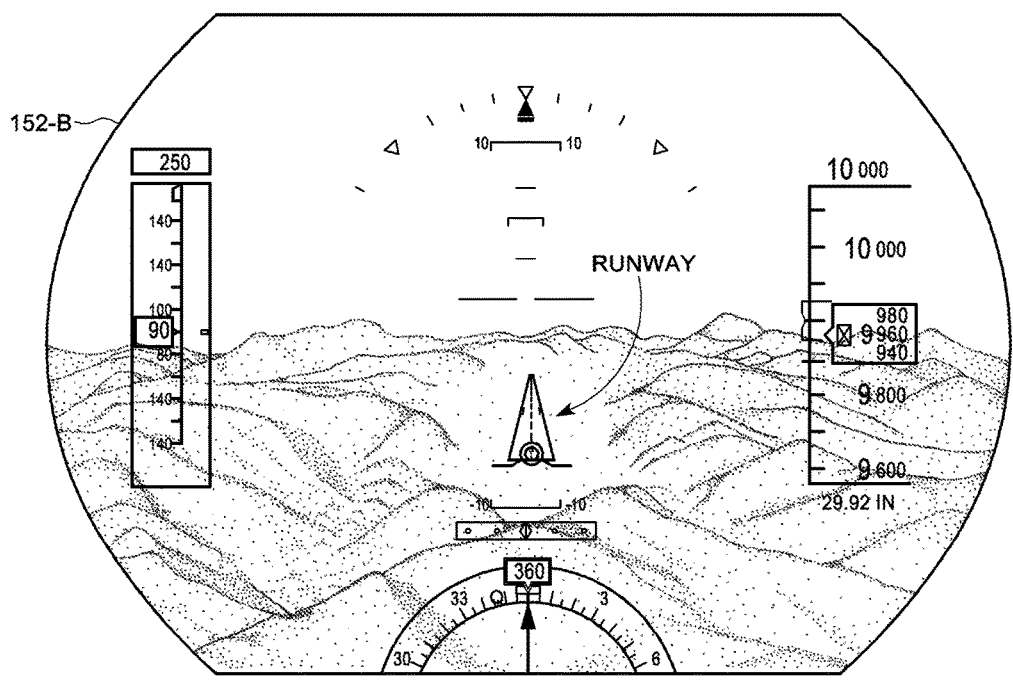
FIG. 3B depicts an exemplary illustration of a head-up display unit.

Referring now to FIG. 3A, an exemplary depiction of a visual display unit 152-A comprised of an HDD has been configured to present tactical information to the pilot or flight crew against the background of a three-dimensional image of terrain and sky. FIG. 3B provides an exemplary depiction of a visual display unit 132-A comprised of a HUD unit for presenting tactical information to the pilot or flight crew against the background of the actual scene of ground and sky outside the aircraft and/or a three-dimensional image of the scene. Both the HDD unit and HUD unit could be employed as display units configured to present SVS image(s), EVS image(s), or combined SVS-EVS image(s). It should be noted that the tactical information depicted on the HDD unit and/or HUD unit has been made minimal for the sake of presentation and is not indicative of the plurality of indications or information with which it may be configured. Because the indications or information shown in FIGS. 3A and 3B are well-known to those skilled in the art, a discussion of the specific tactical information shown on them is not provided herein.

Some advantages and benefits of embodiments discussed herein are shown in FIGS. 4A through 7H by illustrating how one or more LDs received from the LD source 130 may be used to generate an LDI and enhance situational awareness by informing the pilot of one or more LDs. As part of the illustrations, it will be assumed that a hypothetical aircraft has a braking system configured with six pilot-selectable brake settings (manual and five autobrake settings) to which the tables of LDs shown in FIGS. 2A and 2B apply; the six brake settings are shown in the table of FIG. 3A.

Referring now to FIG. 4A, runway and runway markings that could be an image displayed by the visual display unit 152 are illustrated. Runway centerline markings 202 are located along the centerline of the runway between runway designation markings 204 and may be a line of uniformly spaced stripes and gaps identifying the physical center of a runway and provide alignment guidance during takeoff and landing operations.

Runway designation markings 204 identify a runway by a number that is a whole number nearest one-tenth of the magnetic azimuth when viewed from the direction of approach. For example, the runway designation "20" as shown would indicate the magnetic azimuth of the runway is approximately 200 degrees. Runway designation could be supplemented with a letter for parallel runways, and as shown, the runway designation "L" would indicate this surface is a left runway and that there is a separate, parallel runway "20R" to the right of it.

Runway threshold markings 206 identify the beginning of a runway that is available for landing and may be eight longitudinal stripes of uniform dimensions spaced symmetrically about the runway centerline. Runway aiming point markings 208 serve as a visual aiming point for landing operations and could comprise two rectangular markings. Landing threshold points (singularly, LTP) 210 and 212 (or runway threshold points) identify the beginning of the runway threshold for Runways 20L and 2R, respectively.

Referring now to FIG. 4B, an LD indicator (LDI) 213 for Runway 20L (which is assumed herein to be the landing runway) is illustrated in a plan view, where LDI 213 is located next to the surface. The LTP 212 of the Runway 2R (the runway opposite of the landing runway which is assumed herein to be the opposing runway) and an LD 214 may be used to determine the locations of a distal boundary (DB) and a proximal boundary (PB) of LDI 213. LD 214 could be a distance configurable by a manufacturer and/or end-user. In some embodiments, LD 214 could be assigned a default distance such as a fixed LD. In other embodiments, LD 214 could be an LD determined from the tables shown in FIGS. 2A and 2B and stored in LD data source 130 assuming one default pilot-selectable brake setting under normal and/or non-normal configurations. In other embodiments, LD 214 could be an LD determined from the tables based upon the data representative of an actual or current brake setting selected by the pilot and/or data representative of one or more actual LDFs.

In some embodiments, LDI 213 (and the other LDIs disclosed herein) may be presented to the pilot as an exocentric view and/or an exocentric view instead of or in addition to a plan view. For example, an egocentric presentation of LDI 213 is illustrated in FIG. 4C.

When presented with an additional visual indicator corresponding to an estimated touchdown point (ETP) as discussed in the Chiew reference, the pilot could make a visual determination of whether there is a sufficient landing surface to land the aircraft safely. If an ETP indicator is located close to, at, or beyond the PB of LDI 213, the pilot could observe that there is an insufficient amount of landing distance to perform a safe landing, thereby enhancing the pilot's situational awareness and enabling the prevention of landing long and/or overshooting the available surface for landing.

Figure 4C:
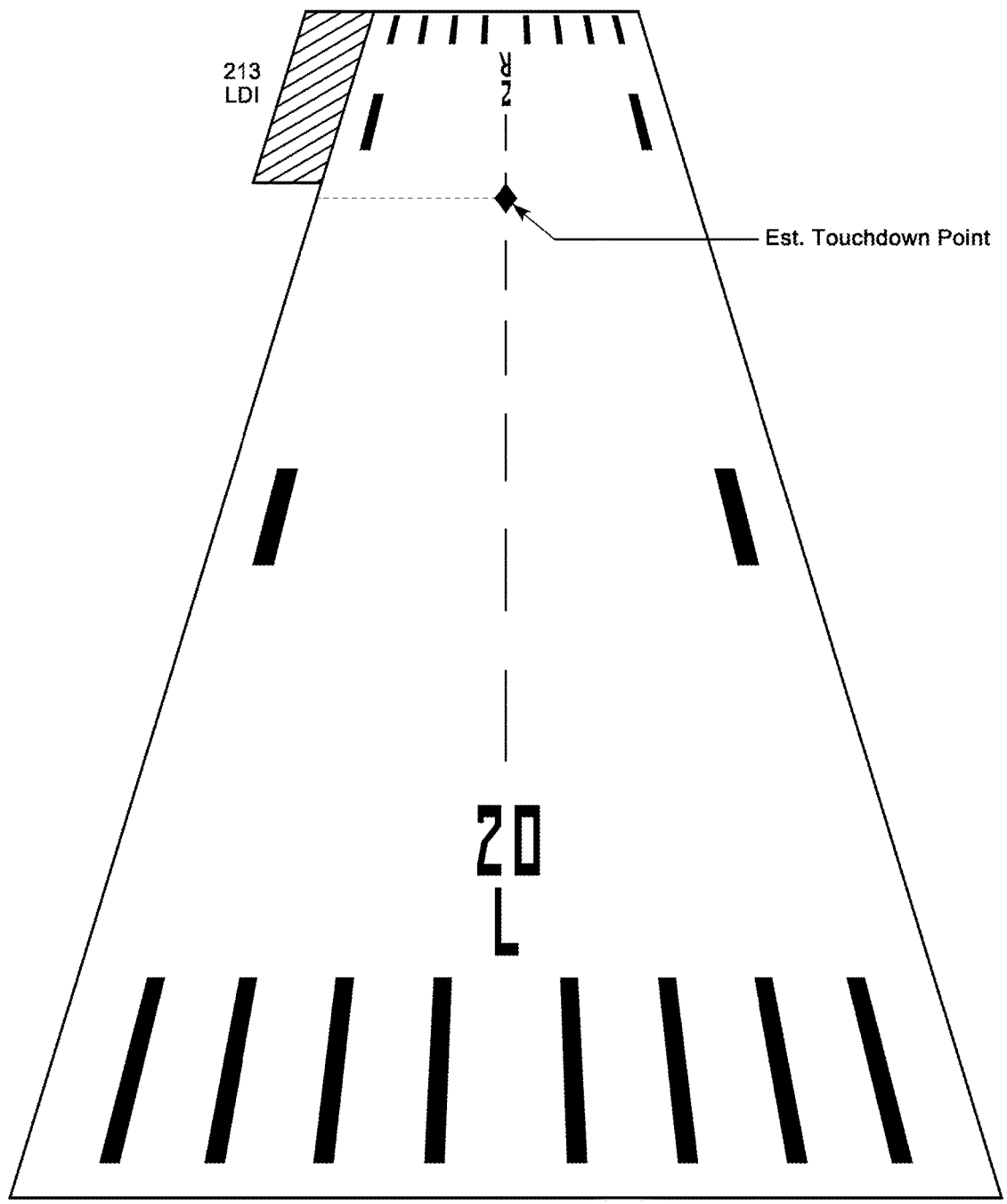
FIG. 4C depicts an exemplary illustration of an LDI shown in an egocentric view.

For example, a yellow cautionary alert "LANDING DISTANCE" has been presented in FIG. 4C, for the ETP is located prior to the PB and within a distance that is configurable by a manufacturer and/or end-user; a similar alert may be presented aurally and/or tactilely via the aural advisory unit 154 and/or tactile advisory unit 156, respectively. From this information, a pilot is informed of a situation for which immediate crew awareness is required and subsequent corrective action will be or may be necessary to address a situation with the LD.

Figure 4D:
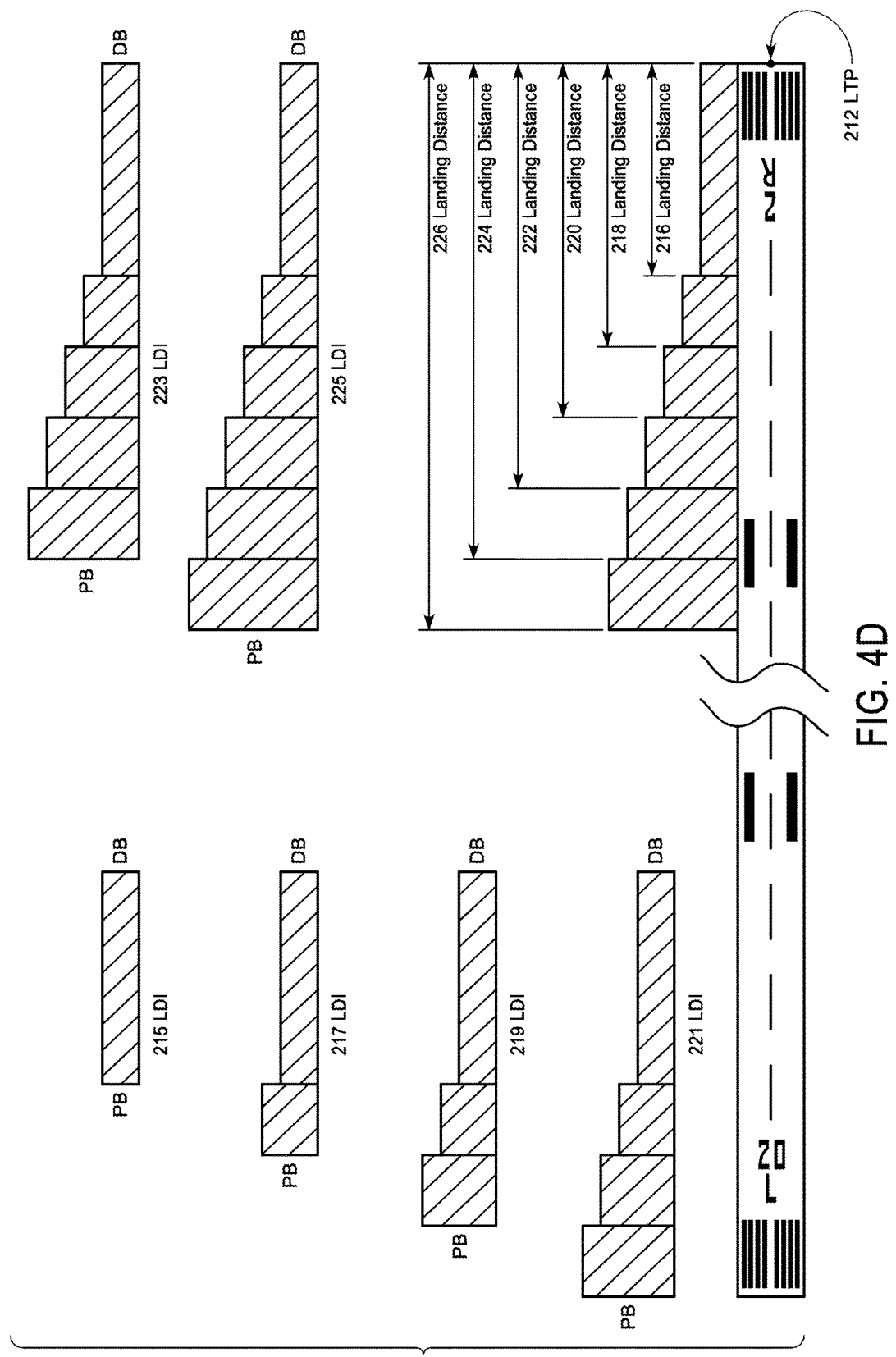
FIG. 4D depicts exemplary illustrations of multiple configurations of an LDI.

Referring now to FIG. 4D, one of a plurality of LDIs that could be possible for the landing runway is illustrated next to the landing runway in a plan view. The LTP 212 of the opposing runway and LDs 216, 218, 220, 222, 224, and 226 may be used to determine the locations of DBs and PBs of LDIs 215, 217, 219, 221, 223, and 225 as shown. LDs 216, 218, 220, 222, 224, and 226 could correspond to possible brake settings selectable by the pilot.

As shown in the tables of FIG. 2A, the are six possible selectable brake settings for the hypothetical aircraft commonly: MAX MANUAL (which assumes the full functionality and the pilot's use of those aircraft systems shown in the table of FIG. 2B for the hypothetical aircraft) and five autobrake settings (which assumes five different, setting-dependent exertions of braking forces applied automatically by the autobrake system). As observed in FIG. 2A, the least LD corresponds to the selection of the MAX MANUAL setting, and the greatest LD corresponds to the selection of the AUTOBRAKE1 setting.

Figure 4E:
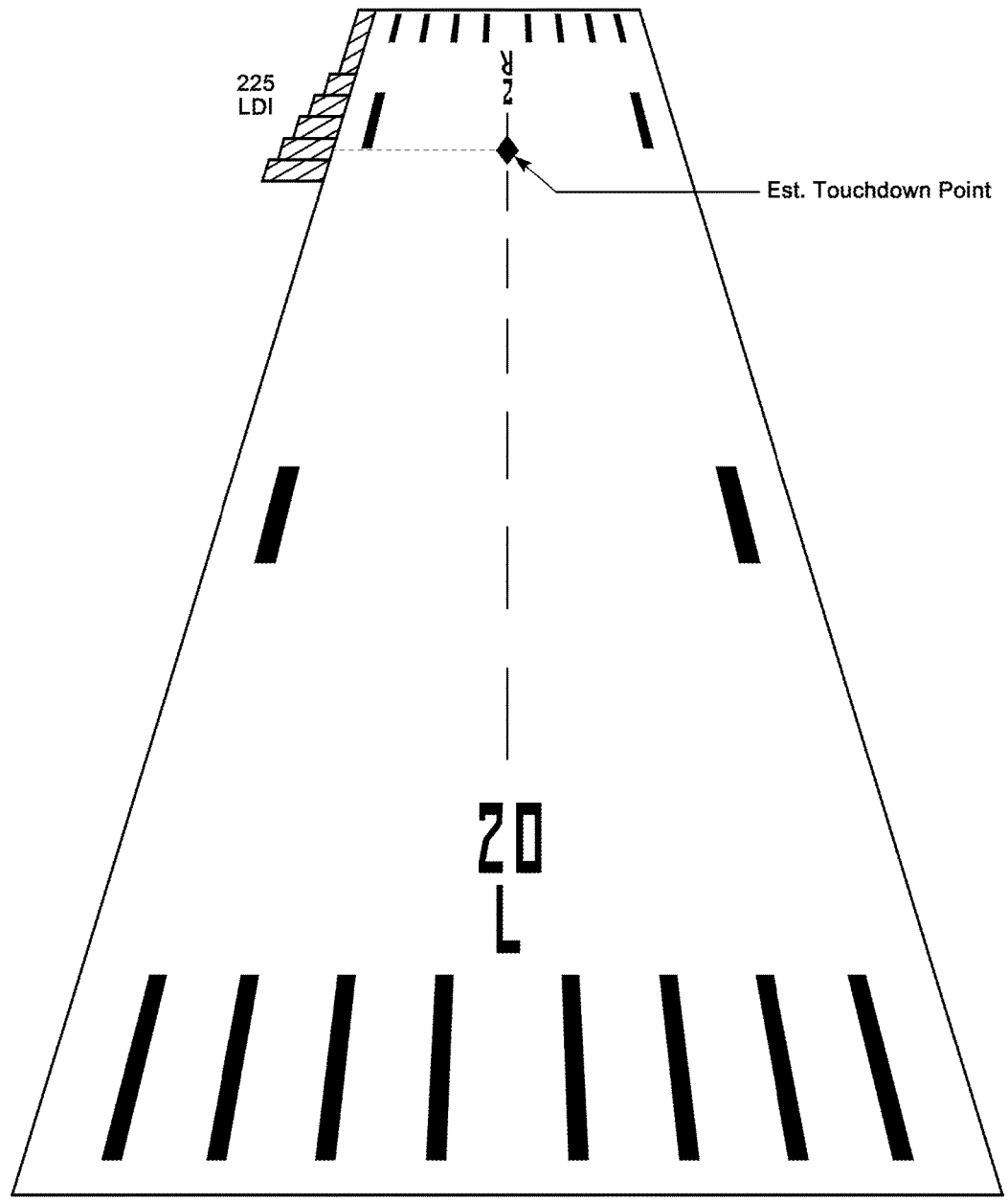
FIG. 4E depicts second exemplary illustrations of multiple configurations of an LDI.

Returning to FIG. 4D, an LD used to define an LDI could be an LD corresponding to a setting; that is, LD 216 could be the LD corresponding to the MAX MANUAL setting, LD 218 could correspond to the MAX AUTO setting, LD 220 could correspond to the AUTOBRAKE 4 setting, LD 222 could correspond to the AUTOBRAKE 3 setting, LD 224 could correspond to the AUTOBRAKE 2 setting, and LD 226 could correspond to the AUTOBRAKE 1 setting. When an ETP indicator is added to the presentation, the pilot could make a visual determination of whether a selection of a specific brake setting will provide a sufficient landing distance to land the aircraft safely. If an ETP indicator is located beyond the PB of an LDI(s), the pilot could observe that there is an insufficient amount of landing distance to perform a safe landing using the specific brake setting(s) corresponding to such LDI(s). Referring now to FIG. 4E, an egocentric presentation of LDI 225 defined by LD 226 is illustrated.

In addition, a red warning alert "LANDING DISTANCE" has been presented in FIG. 4E, for the ETP is located beyond the PB; a similar alert may be presented aurally and/or tactilely via the aural advisory unit 154 and/or tactile advisory unit 156, respectively. From this information, a pilot is informed of the existence of inadequate LD for which immediate crew action is required.

Figure 4F:
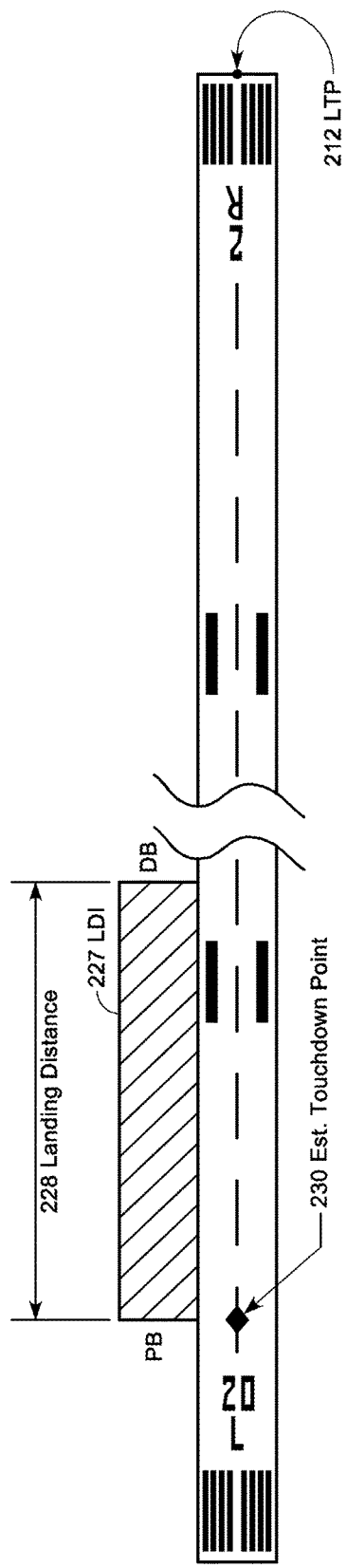
FIG. 4F depicts an exemplary illustration of one configuration of an LDI.

Referring now to FIG. 4F, an LDI 227 located next to the surface for the landing runway is illustrated in a plan view. An ETP 230 of the landing runway and an LD 228 may be used to determine the locations of a PB and a DB of LDI 227 as shown. Similar to the LD 214 of FIG. 4B, LD 228 of FIG. 4F could be a distance configurable by a manufacturer and/or end-user.

Figure 4G:
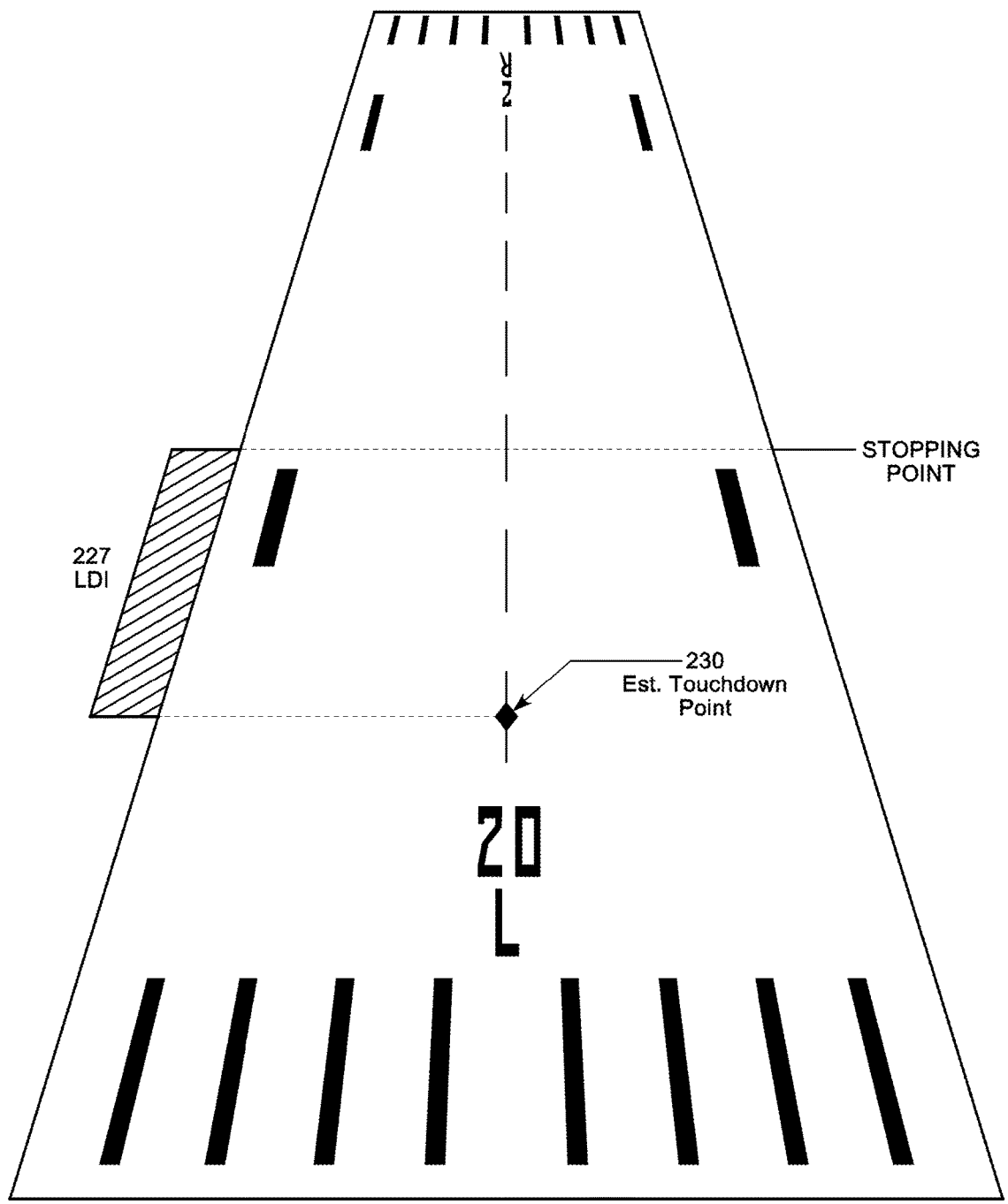
FIG. 4G depicts a second exemplary illustration of one configuration of an LDI.

As the aircraft approaches the runway to land, LDI 227 may move with movement of the ETP 230. If at least a part of LDI 227 goes beyond the LTP 212, the pilot could observe that there is an insufficient amount of landing distance to perform a safe landing. Referring to FIG. 4G, an egocentric presentation of LDI 227 is illustrated. In addition, an additional visual indicator corresponding to a stopping point may be presented adjacent to the DB, allowing a pilot an indication of a stopping point corresponding to the LDI 227.

Referring now to FIG. 4H, one of a plurality of LDIs that could be possible for the landing runway is illustrated next to the landing runway in a plan view. The ETP 230 of the landing runway and LDs 232, 234, 236, 238, 240, and 242 may be used to determine the locations of PBs and DBs of LDIs 231, 233, 235, 237, 239, and 241, respectively. Similar to the LDs of FIG. 4D, LDs 232, 234, 236, 238, 240, and 242 of FIG. 4H could correspond to possible brake settings selectable by the pilot.

Figure 4I:
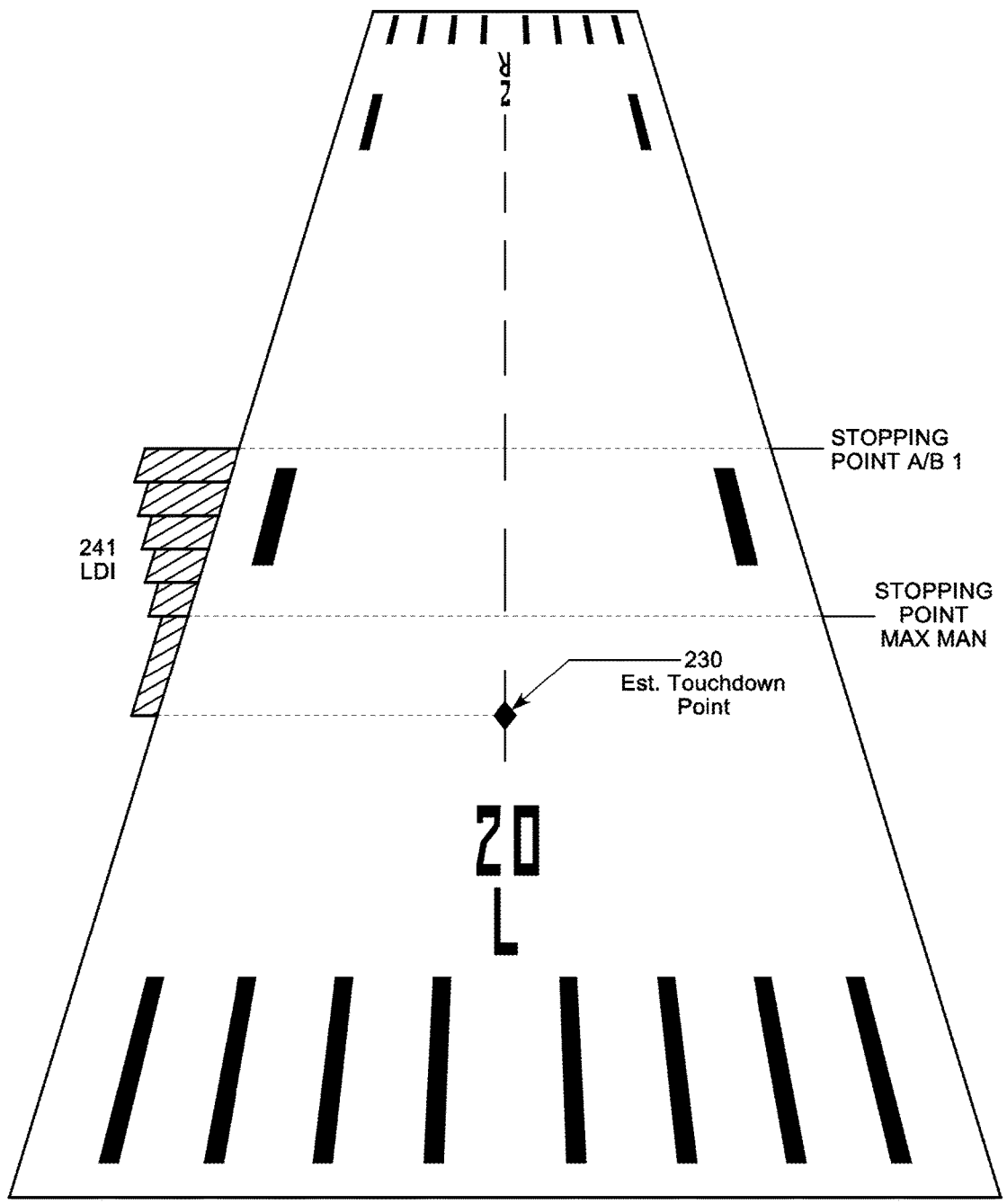
FIG. 4I depicts fourth exemplary illustrations of multiple configurations of an LDI.

As the aircraft approaches the runway to land, LDI 231, 233, 235, 237, 239, or 241 may move with movement of the ETP 230. If at least a part of an LDI(s) goes beyond the LTP 212, the pilot could observe that there is an insufficient amount of landing distance to perform a safe landing for the specific brake setting(s) corresponding to such LDI(s). Referring now to FIG. 4I, an egocentric presentation of LDI 241 is illustrated. In addition, additional visual indicators corresponding to stopping points of one or more specific autobrake settings may be presented adjacent to the respective DBs, allowing a pilot an indication of one or more stopping points corresponding to the LDI 241.

Referring now to FIG. 5A, other non-runway surfaces are illustrated. A displaced threshold 302 could be identified with arrows and arrowheads, and blast pad or stopway 304 could be identified with chevrons. A runway threshold bar 306 could delineate the beginning of the runway (of Runway 2R) that is available for landing (when landing on Runway 2R), and a demarcation bar 208 could delineate the boundary between a displaced threshold 302 and a blast pad or stopway 304. Generally, the displaced threshold 302 may be used for takeoff (on Runway 2R) and after-landing roll out (when landing on Runway 20L).

Referring now to FIG. 5B, an LDI 313 for Runway 20L is illustrated in a plan view, where LDI 313 is located next to the runway surface and displayed threshold 302. The LTP 312 of Runway 2R and the distance of the displaced threshold 302 from the LTP 312 may be used to determine the location of a DB of the LDI 313, and an LD 314 may be used to determine the location of a PB. Similar to the LD 214 of FIG. 4B, LD 314 of FIG. 5B could be a distance configurable by a manufacturer and/or end-user.

Figure 5C:
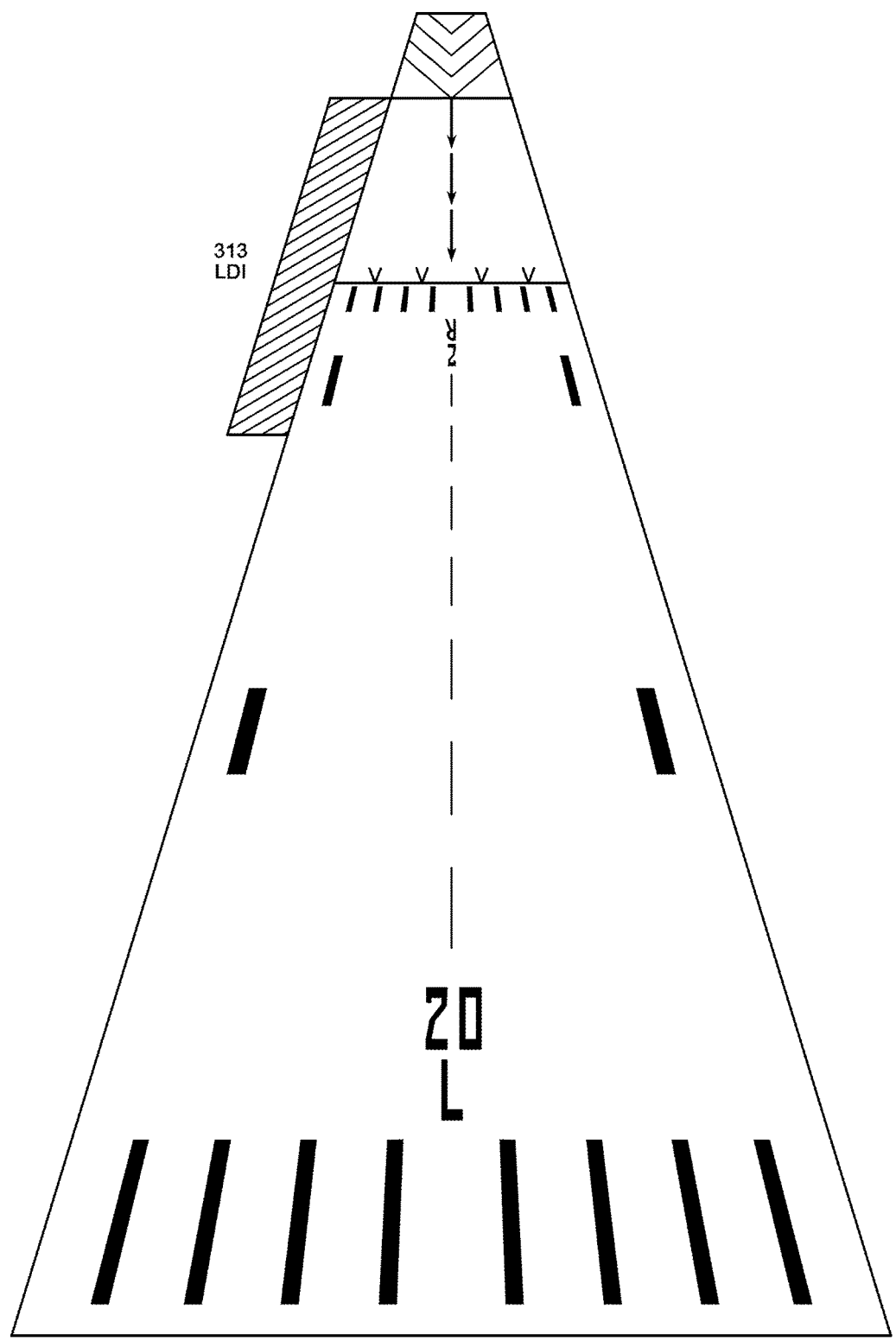
FIG. 5C depicts an exemplary illustration of an LDI shown in an egocentric view of a runway with a displaced threshold.

If an ETP indicator is located beyond the PB of LDI 313, the pilot could observe that there is an insufficient amount of landing distance to perform a safe landing. Referring now to FIG. 5C, an egocentric presentation of LDI 313 is illustrated.

Figure 5D:
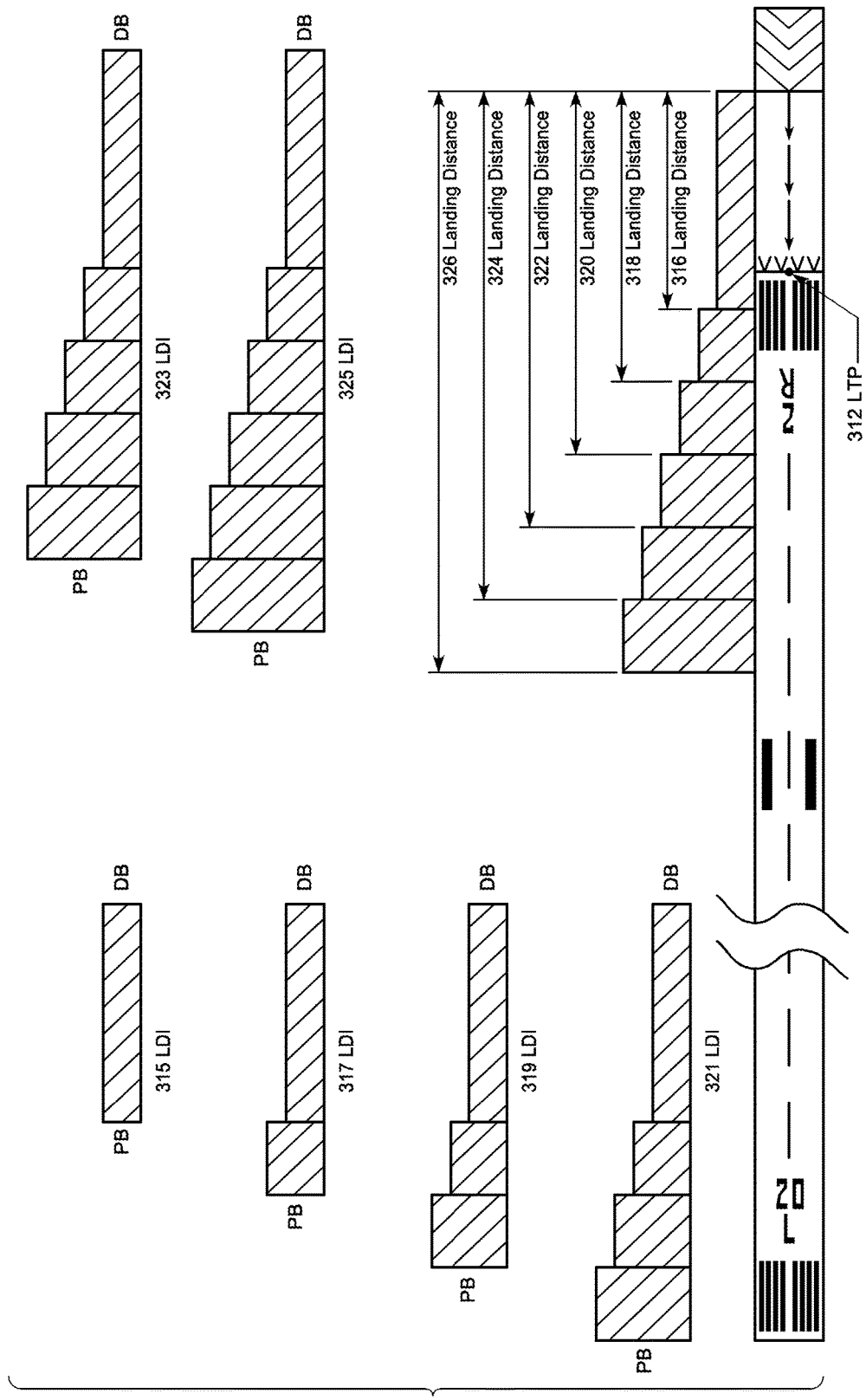
FIG. 5D depicts exemplary illustrations of multiple configurations of an LDI shown with a displaced threshold.

Referring now to FIG. 5D, one of a plurality of LDIs that could be possible for Runway 20L is illustrated in a plan view next to the runway surface and displaced threshold. The LTP 312 of Runway 2R and the displaced threshold may be used to determine the location of DBs of LDIs 315, 317, 319, 321, 323, and 325; and LDs 316, 318, 320, 322, 324, and 326 may be used to determine the locations of PBs of LDIs 315, 317, 319, 321, 323, and 325, respectively. Similar to the LDs of FIG. 4D, LDs 316, 318, 320, 322, 324, and 326 of FIG. 5D could correspond to possible brake settings selectable by the pilot.

Figure 5E:
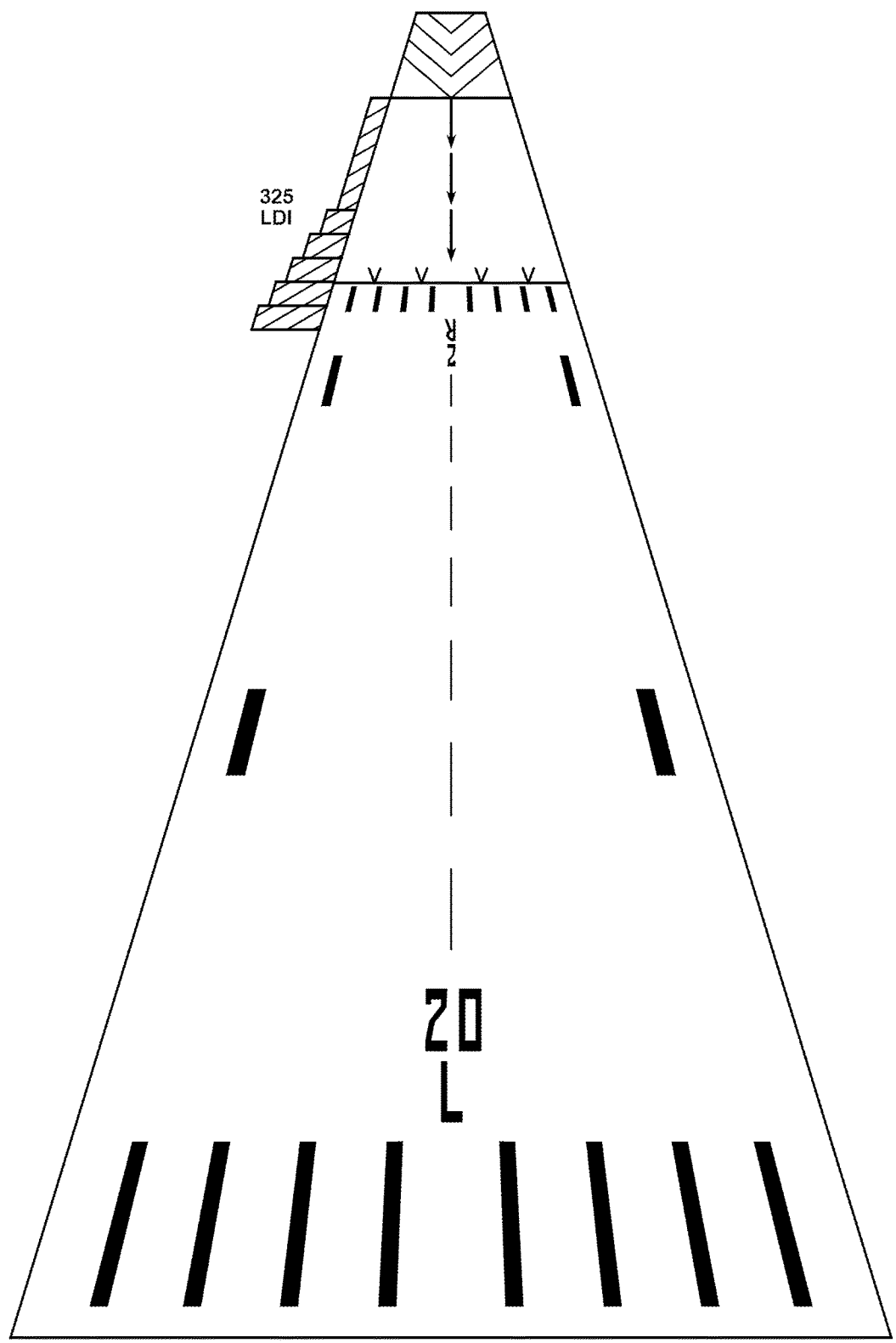
FIG. 5E depicts second exemplary illustrations of multiple configurations of an LDI shown with a displaced threshold.

If an ETP indicator is located beyond the PB of an LDI(s), the pilot could observe that there is an insufficient amount of landing distance to perform a safe landing using the specific brake setting(s) corresponding to such LDI(s). Referring now to FIG. 5E, an egocentric presentation of LDI 325 is illustrated.

Figure 5F:
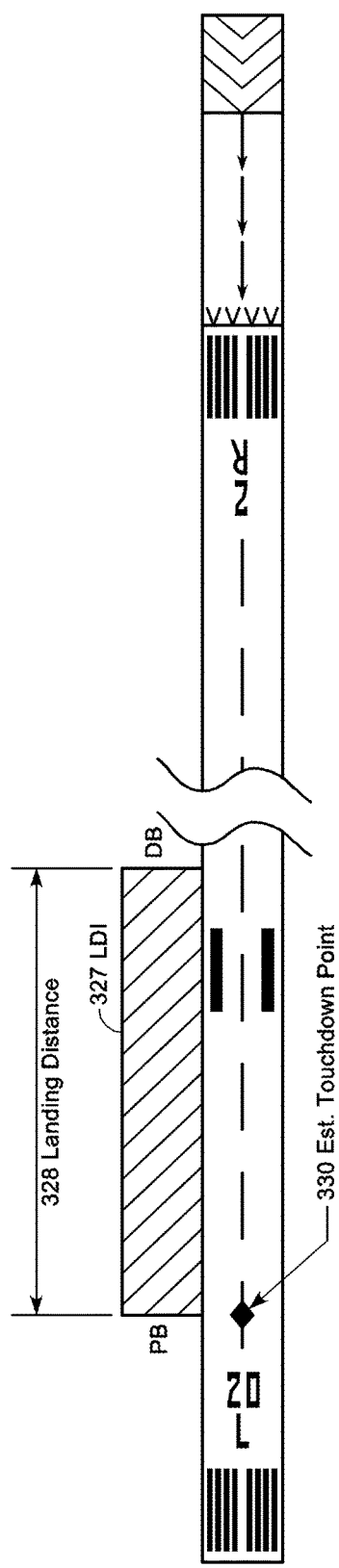
FIG. 5F depicts an exemplary illustration of one configuration of an LDI shown with a displaced threshold.

Referring now to FIG. 5F, an LDI 327 located next to the runway surface is illustrated in a plan view. An ETP 330 of Runway 20L and an LD 328 may be used to determine the locations of a PB and a DB of LDI 327 as shown. Similar to the LD 214 of FIG. 4B, LD 328 of FIG. 5F could be a distance configurable by a manufacturer and/or end-user.

Figure 5G:
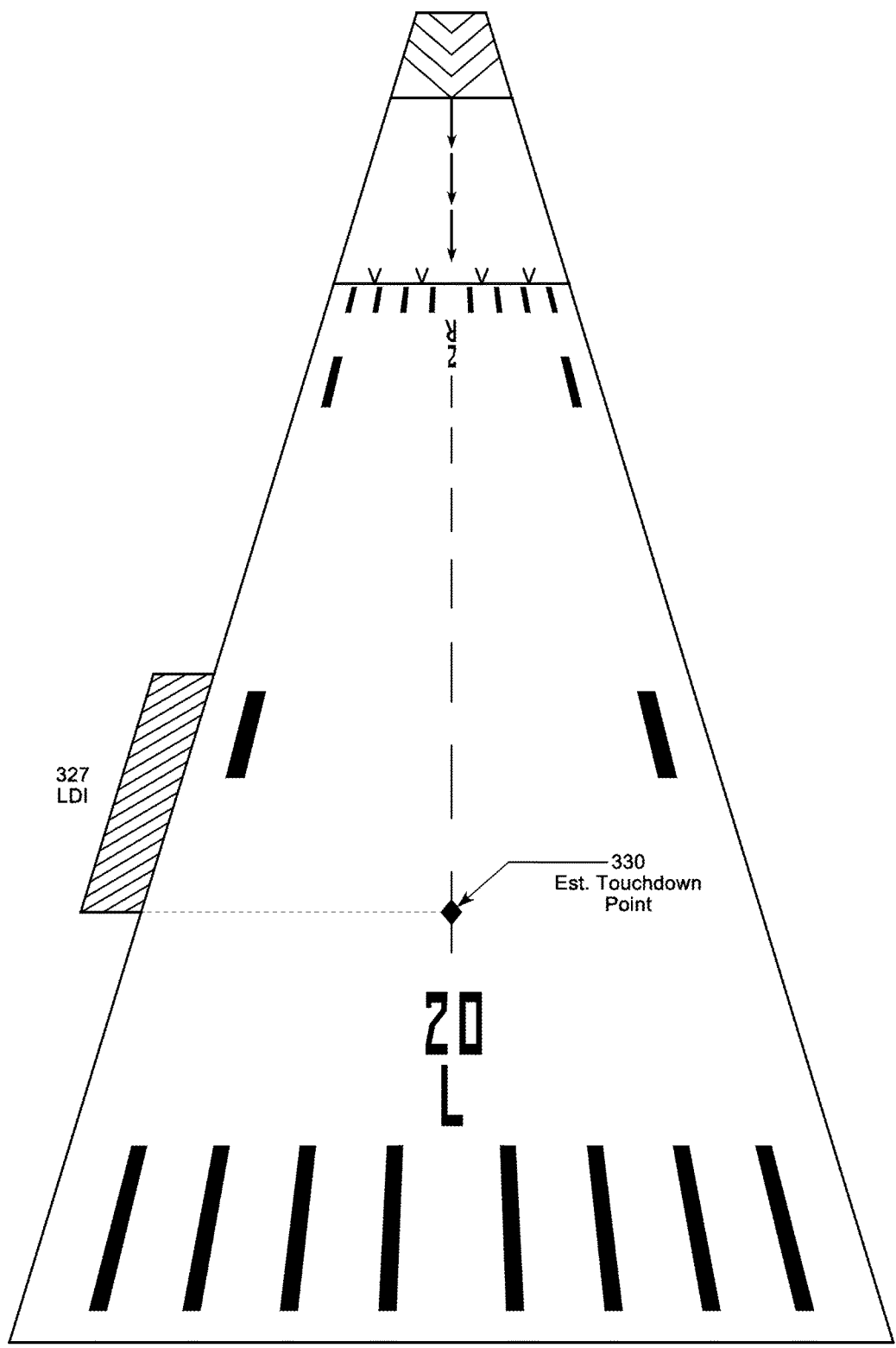
FIG. 5G depicts a second exemplary illustration of one configuration of an LDI shown with a displaced threshold.

As the aircraft approaches the runway to land, LDI 327 may move with movement of the ETP 330. If at least a part of LDI 327 goes beyond the displaced threshold, the pilot could observe that there is an insufficient amount of landing distance to perform a safe landing. Referring now to FIG. 5G, an egocentric presentation of LDI 327 is illustrated.

Figure 5H:
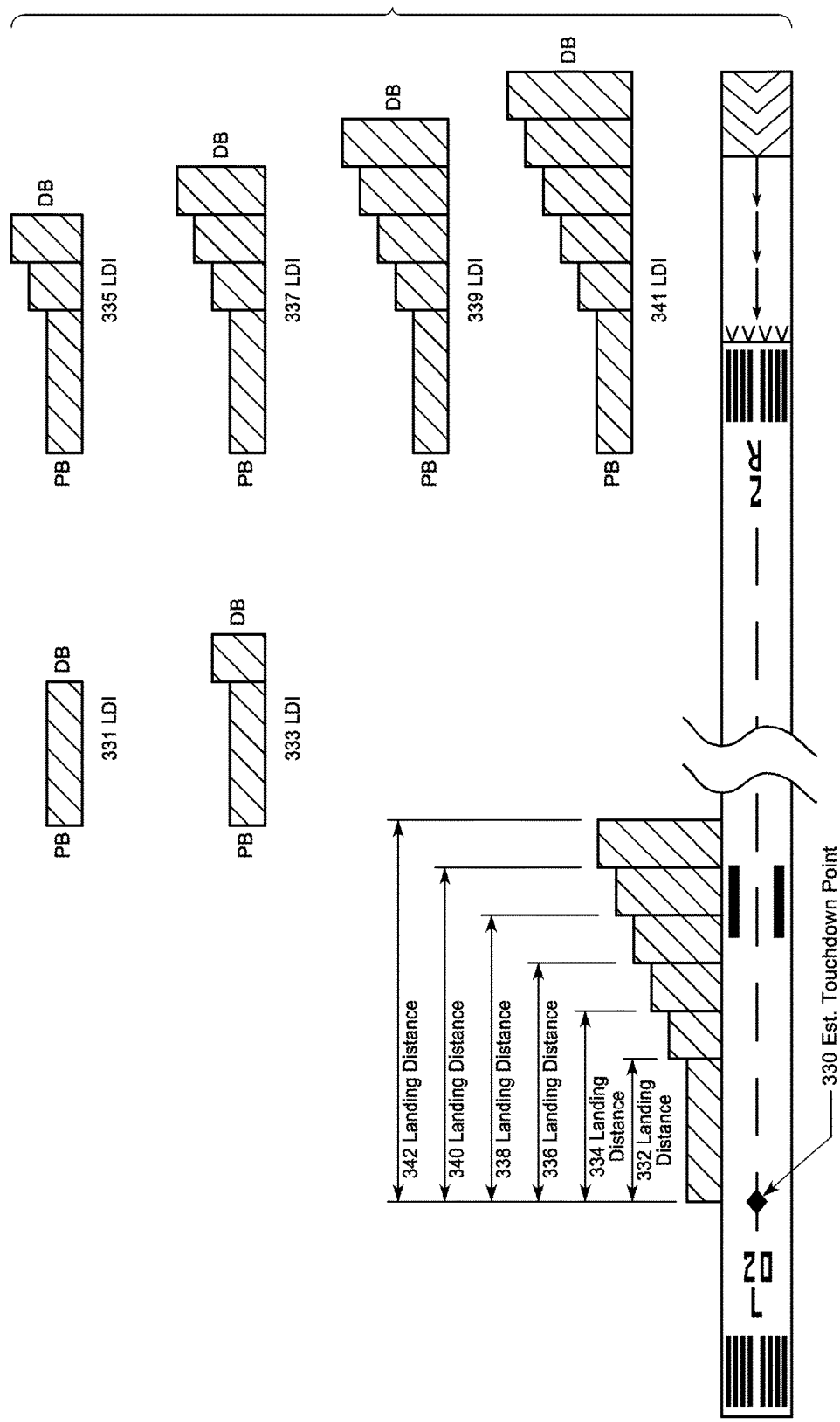
FIG. 5H depicts third exemplary illustrations of multiple configurations of an LDI shown with a displaced threshold.

Referring now to FIG. 5H, one of a plurality of LDIs that could be possible for the landing runway is illustrated next to the runway surface in a plan view. The ETP 330 of Runway 20L and LDs 332, 334, 336, 338, 340, and 342 may be used to determine the locations of PBs and DBs of the LDIs 331, 333, 335, 337, 339, and 341 as shown. Similar to the LDs of FIG. 4D, LDs 332, 334, 336, 338, 340, and 342 of FIG. 5H could correspond to possible brake settings selectable by the pilot.

Figure 5I:
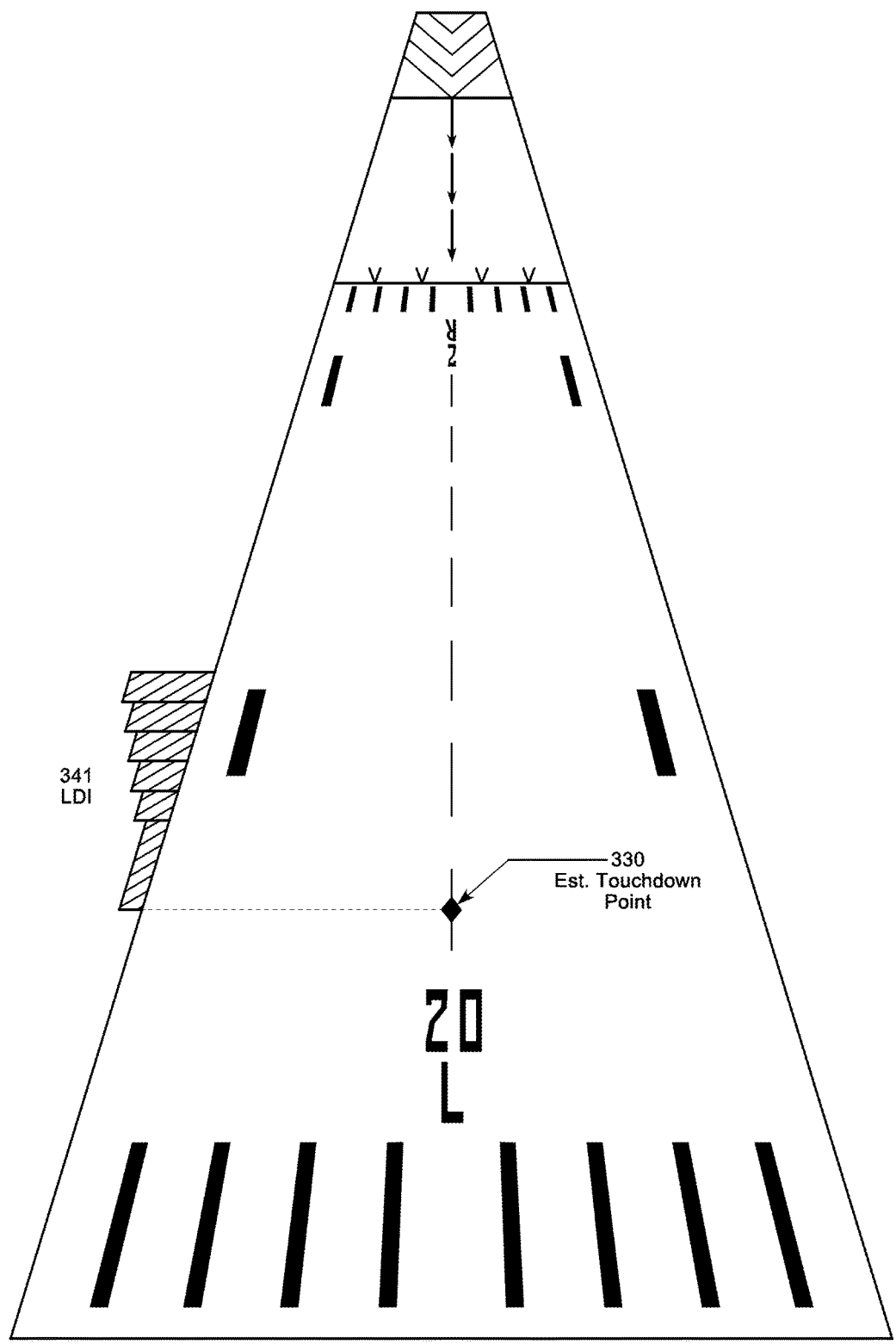
FIG. 5I depicts fourth exemplary illustrations of multiple configurations of an LDI shown with a displaced threshold.

As the aircraft approaches the runway to land, LDIs 331, 333, 335, 337, 339, or 341 may move with movement of the ETP 330. If at least a part of LDI(s) goes beyond the displaced threshold, the pilot could observe that there is an insufficient amount of landing distance to perform a safe landing using the specific brake setting(s) corresponding to such LDI(s). Referring now to FIG. 5I, an egocentric presentation of the LDI 341 is illustrated.

Figure 6A:
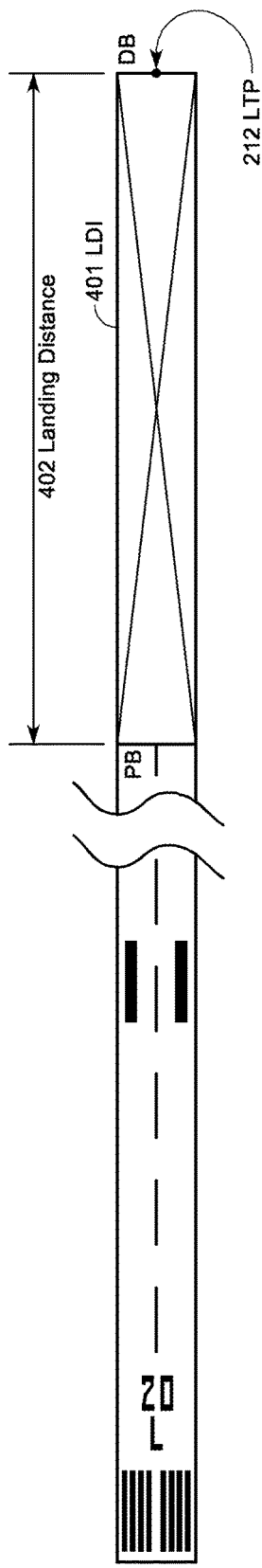
FIG. 6A depicts an exemplary illustration of an LDI shown in a plan view and located on the surface of a runway.

Referring now to FIG. 6A, an LDI 401 for Runway 20L is illustrated in a plan view, where LDI 401 is located on the runway surface. The LTP 212 of the Runway 2R and an LD 402 may be used to determine the locations of a DB and a PB of LDI 401. Similar to the LD 214 of FIG. 4B, the LD 402 of FIG. 6A could be a distance configurable by a manufacturer and/or end-user. If an ETP indicator is located beyond the PB of LDI 401, the pilot could observe that there is an insufficient amount of landing distance to perform a safe landing.

Figure 6B:
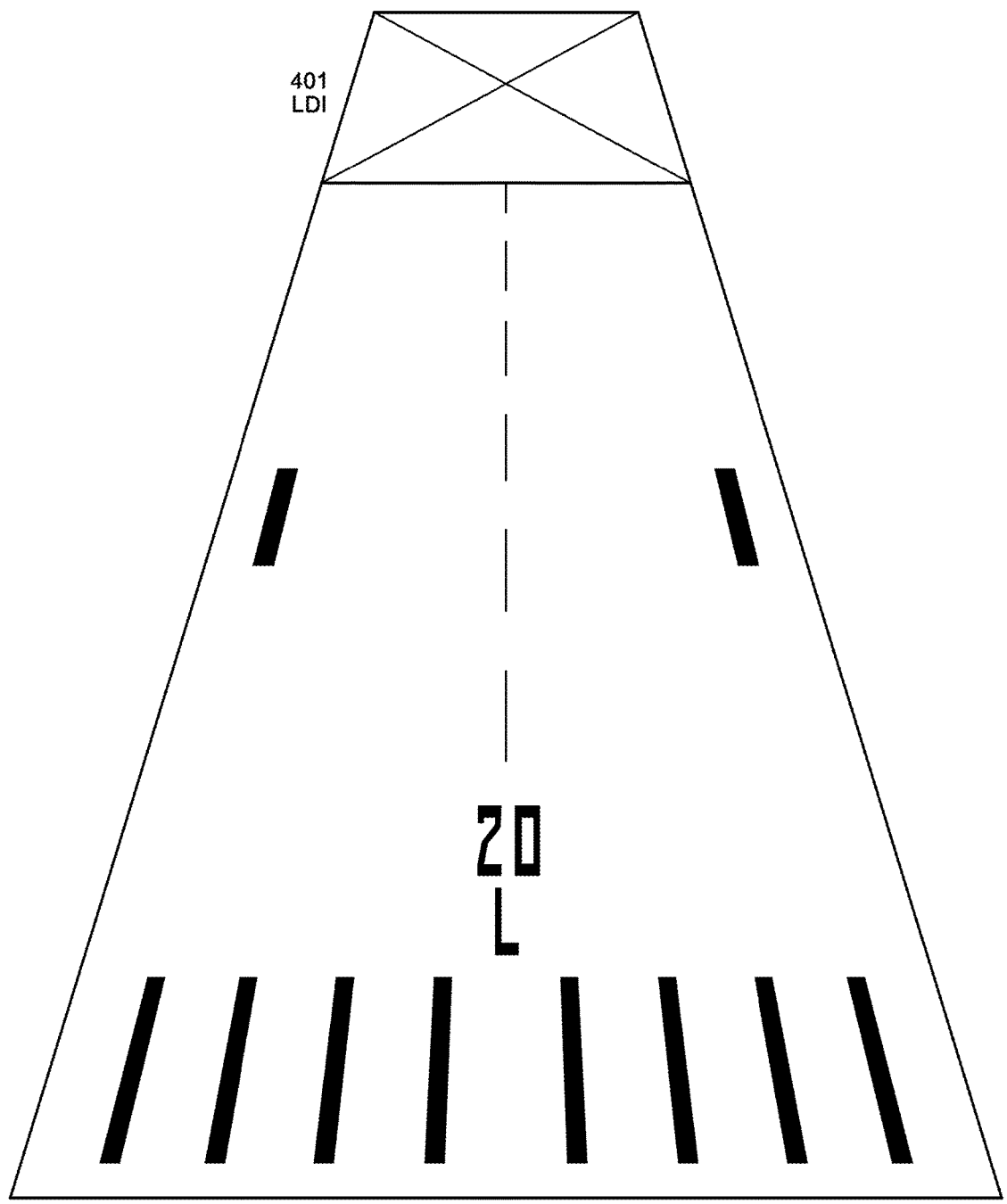
FIG. 6B depicts an exemplary illustration of an LDI shown in an egocentric and located on the surface of a runway.

As observed, LDI 401 includes a cross. While those skilled in the art understand that yellow cross markings placed at each end of each runway of a runway surface signify that both runways are closed, a non-traditional use of a cross including a yellow cross (and other traditional surface markings) may signify an LDI in some embodiments. Referring now to FIG. 6B, an egocentric presentation of LDI 401 is illustrated.

Figure 6C:
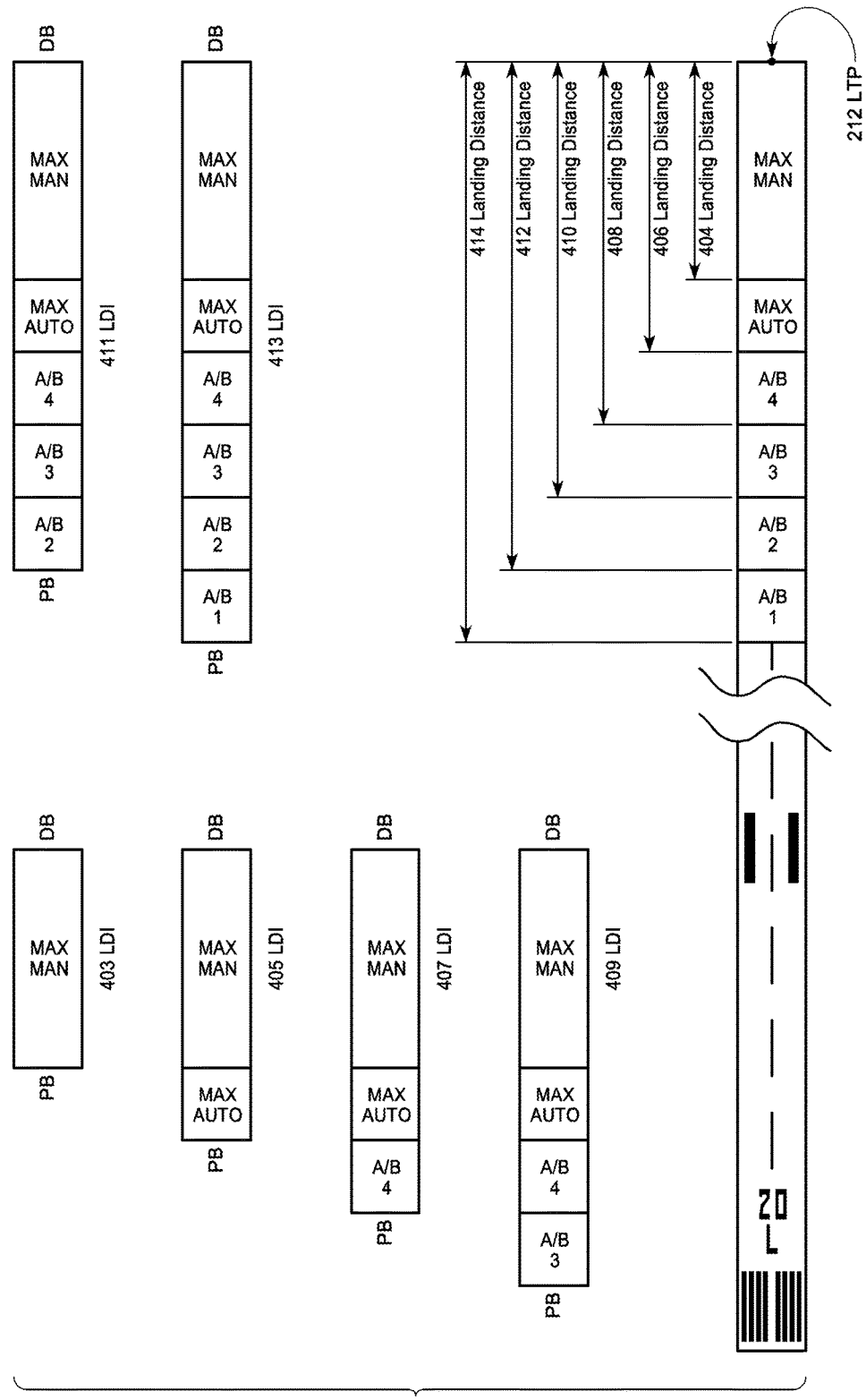
FIG. 6C depicts exemplary illustrations of multiple configurations of an LDI located on the surface of a runway.

Referring now to FIG. 6C, one of a plurality of LDIs that could be possible for Runway 20L is illustrated on the runway surface in a plan view. The LTP 212 of Runway 2R and LDs 404, 406, 408, 410, 412, and 414 may be used to determine the location of DBs and PBs of LDIs 403, 405, 407, 409, 411, and 413 as shown.

In some embodiments, LDIs could include a plurality of zones defined by LDs corresponding to brake settings. Referring now to FIG. 6C, LDI 405 includes a MAX MAN zone and a MAX AUTO zone, the former being defined by LD 404 corresponding to the MAX MANUAL setting and the latter as a difference between LD 406 corresponding to the MAX AUTO setting and LD 404. Similarly, LDI 407 includes the MAX MAN zone, the MAX AUTO zone, and an A/B 4 zone, the latter being defined as a difference between LD 408 corresponding to the AUTOBRAKE 4 setting and LD 406; LDI 409 includes the MAX MAN zone, the MAX AUTO zone, the NB 4 zone, and an NB 3 zone, the latter being defined as a difference between LD 410 corresponding to the AUTOBRAKE 3 setting and LD 408; LDI 411 includes the MAX MAN zone, the MAX AUTO zone, the NB 4 zone, the A/B 3 zone, and an NB 2 zone, the latter being defined as a difference between LD 412 corresponding to the AUTOBRAKE 2 setting and LD 410; and LDI 413 includes the MAX MAN zone, the MAX AUTO zone, the A/B 4 zone, the NB 3 zone, the A/B 2 zone, and an A/B 1 zone, the latter being defined as a difference between LD 414 corresponding to the AUTOBRAKE 1 setting and LD 412.

Figure 6D:
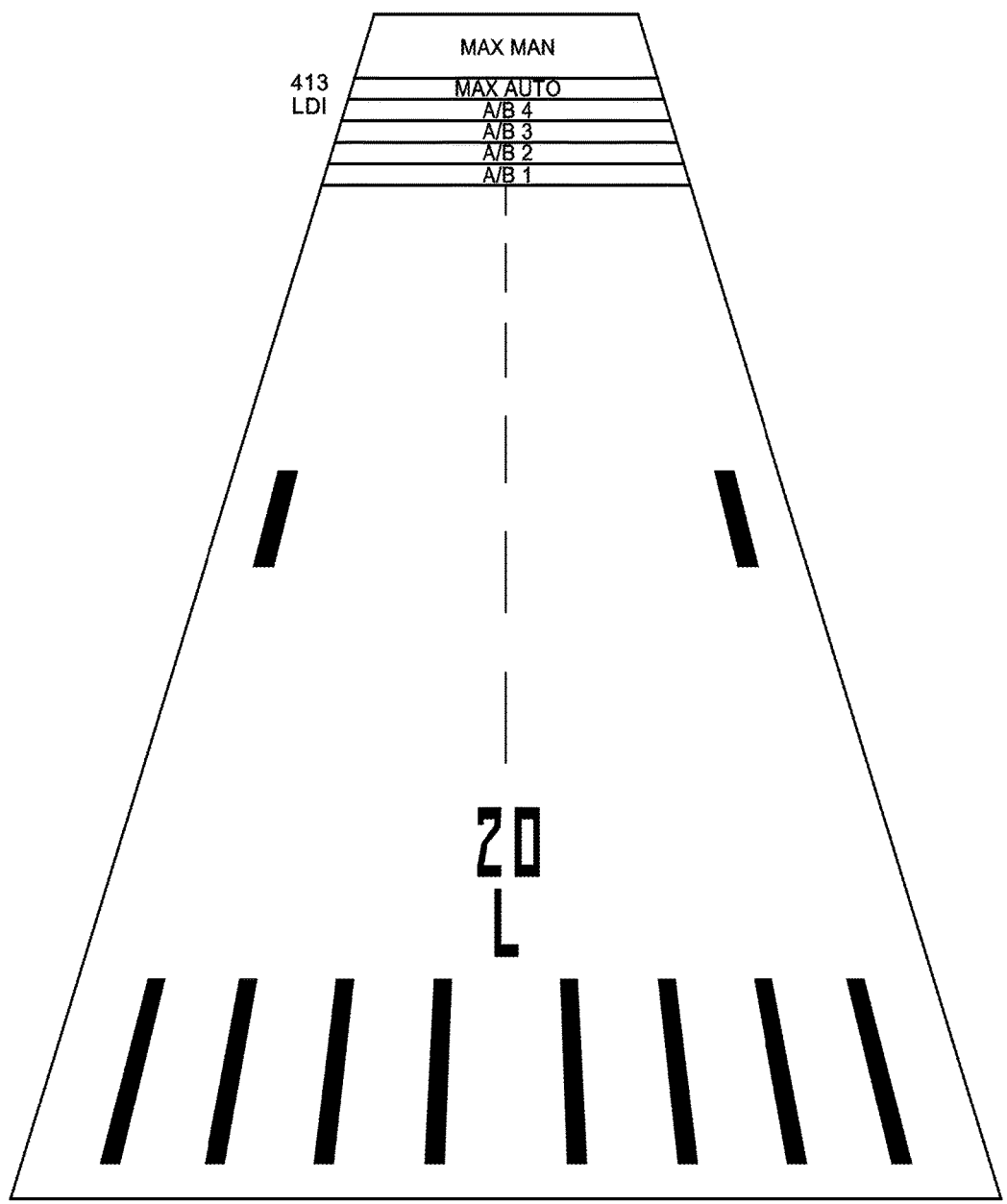
FIG. 6D depicts second exemplary illustrations of multiple configurations of an LDI located on the surface of a runway.

If an ETP indicator is located beyond the PB of an LDI(s), the pilot could observe that there is an insufficient amount of landing distance to perform a safe landing using the specific brake setting(s) corresponding to such LDI(s). Referring now to FIG. 6D, an egocentric presentation of LDI 413 is illustrated.

Figure 6E:
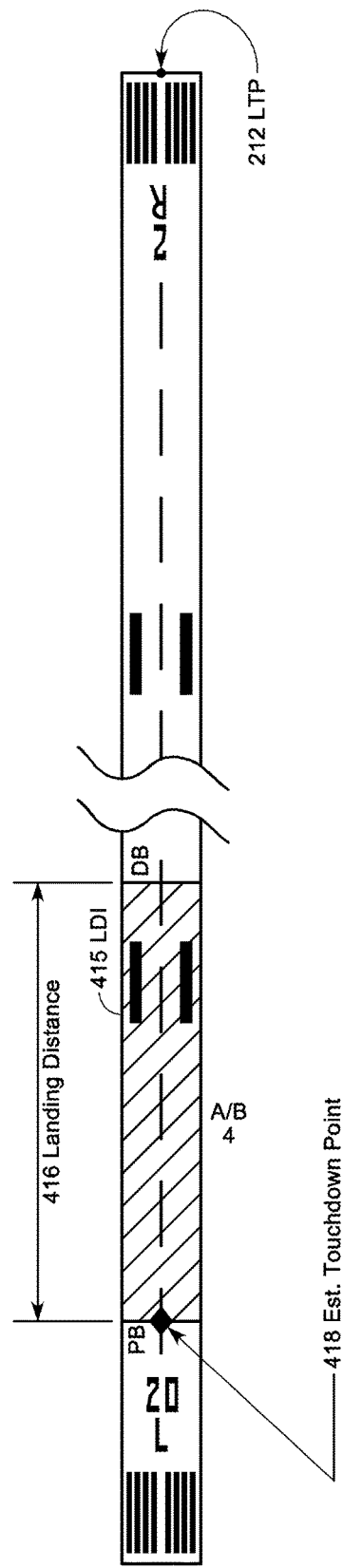
FIG. 6E depicts an exemplary illustration of one configuration of an LDI located on the surface of a runway.

Referring now to FIG. 6E, an LDI 415 for the landing runway is illustrated on the runway surface in a plan view. An ETP 418 of Runway 20L and an LD 416 may be used to determine the locations of a PB and a DB of LDI 415 as shown. Similar to LD 214 of FIG. 4B, LD 416 of FIG. 6E could be a distance configurable by a manufacturer and/or end-user. As observed, LD 416 has be configured to correspond to the AUTOBRAKE 4 setting, which may also be the same brake system setting currently selected by the pilot.

Figure 6F:
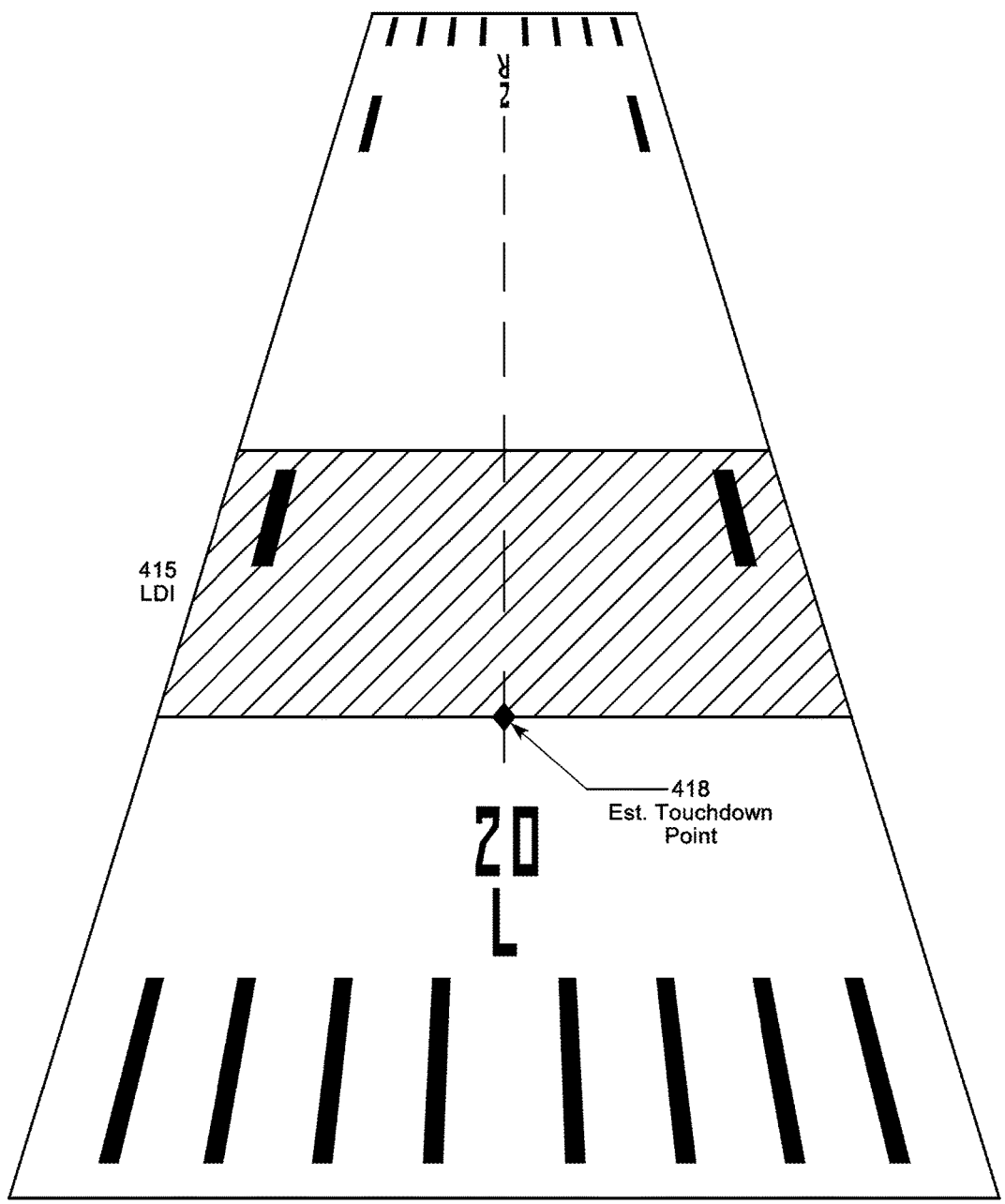
FIG. 6F depicts a second exemplary illustration of one configuration of an LDI located on the surface of a runway.

As the aircraft approaches the runway to land, LDI 415 may move with movement of the ETP 418. If at least a part of LDI 415 goes beyond the LTP 212, the pilot could observe that there is an insufficient amount of landing distance to perform a safe landing. Referring now to FIG. 6F, an egocentric presentation of LDI 415 is illustrated.

Figure 6G:
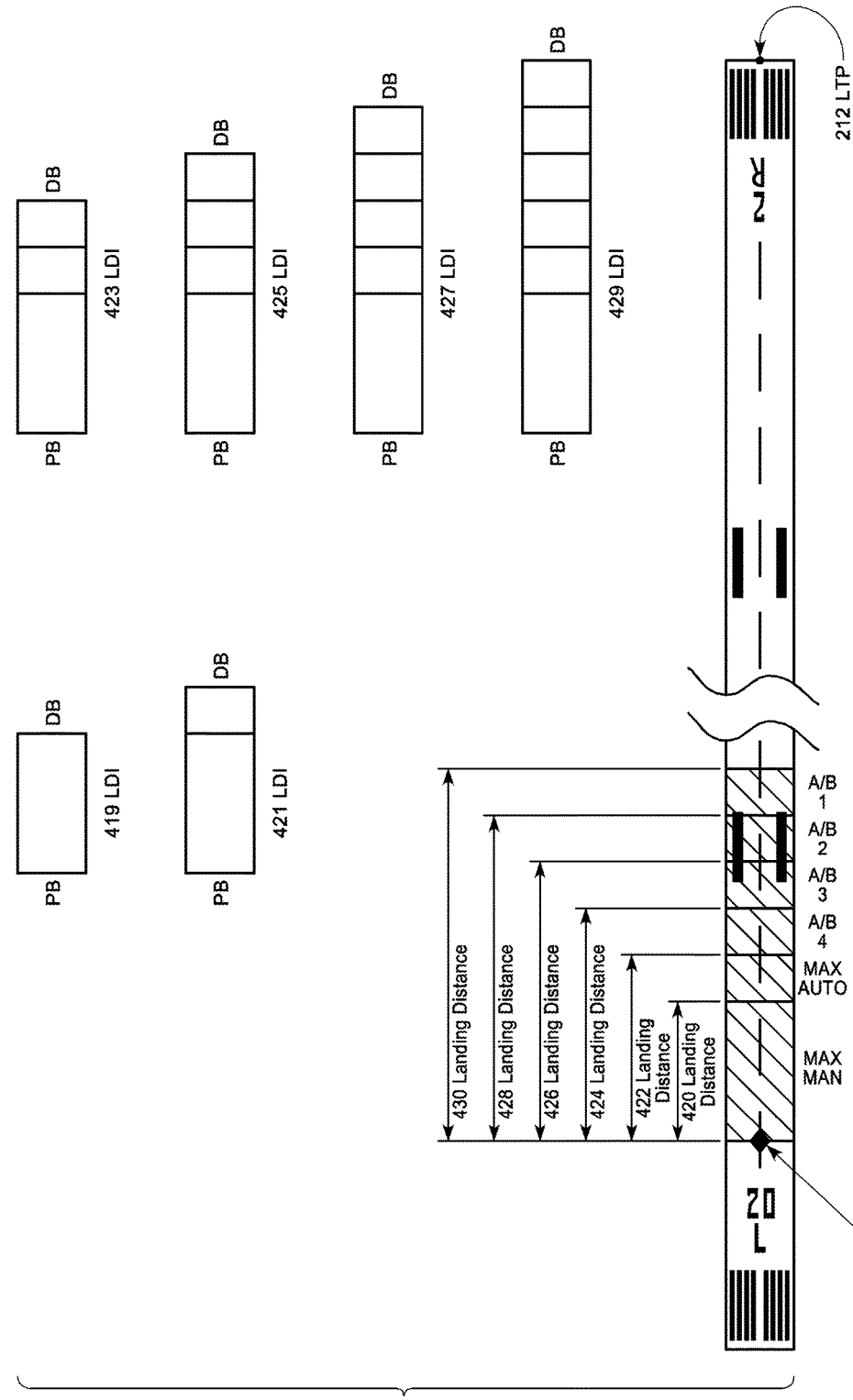
FIG. 6G depicts third exemplary illustrations of multiple configurations of an LDI located on the surface of a runway.

Referring now to FIG. 6G, one of a plurality of LDIs that could be possible for the landing runway is illustrated on the runway surface in a plan view. The ETP 418 and LDs 420, 422, 424, 426, 428, and 430 may be used to determine the locations of PBs and DBs of LDIs 419, 421, 423, 425, 427, and 429 as shown. Similar to the LDs of FIG. 4D, LDs 420, 422, 424, 426, 428, and 430 of FIG. 6G could correspond to possible brake settings selectable by the pilot.

As stated above, LDIs in some embodiments could include a plurality of zones defined by LDs corresponding to brake settings. Referring now to FIG. 6G, LDI 421 includes a MAX MAN zone and a MAX AUTO zone, the former being defined by LD 420 corresponding to the MAX MANUAL setting and the latter as a difference between LD 422 corresponding to the MAX AUTO setting and LD 420. Similarly, LDI 423 includes the MAX MAN zone, the MAX AUTO zone, and an NB 4 zone, the latter being defined as a difference between LD 424 corresponding to the AUTO-BRAKE 4 setting and LD 422; LDI 425 includes the MAX MAN zone, the MAX AUTO zone, the NB 4 zone, and an NB 3 zone, the latter being defined as a difference between LD 426 corresponding to the AUTOBRAKE 3 setting and LD 424; LDI 427 includes the MAX MAN zone, the MAX AUTO zone, the NB 4 zone, the A/B 3 zone, and an NB 2 zone, the latter being defined as a difference between LD 428 corresponding to the AUTOBRAKE 2 setting and LD 426; and LDI 429 includes the MAX MAN zone, the MAX AUTO zone, the A/B 4 zone, the NB 3 zone, the A/B 2 zone, and an A/B 1 zone, the latter being defined as a difference between LD 430 corresponding to the AUTOBRAKE 1 setting and LD 428.

Figure 6H:
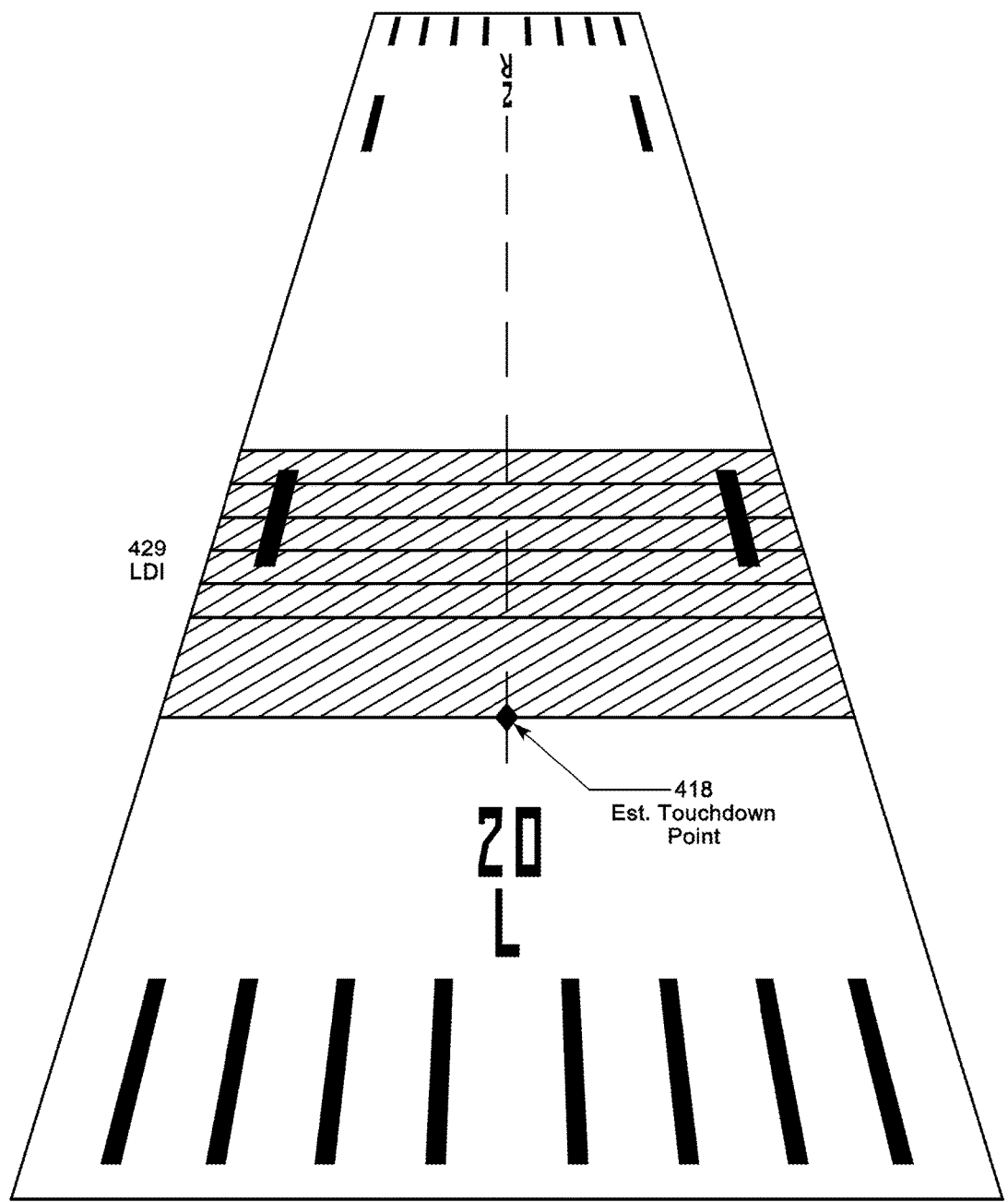
FIG. 6H depicts fourth exemplary illustrations of multiple configurations of an LDI located on the surface of a runway.

As the aircraft approaches the runway to land, LDIs 419, 421, 423, 427, or 429 may move with movement of the ETP 418. If at least a part of an LDI(s) goes beyond the LTP 212, the pilot could observe that there is an insufficient amount of landing distance to perform a safe landing using the specific brake setting(s) corresponding to such LDI(s). Referring to FIG. 6H, an egocentric presentation of LDI 429 is illustrated.

Figure 7B:
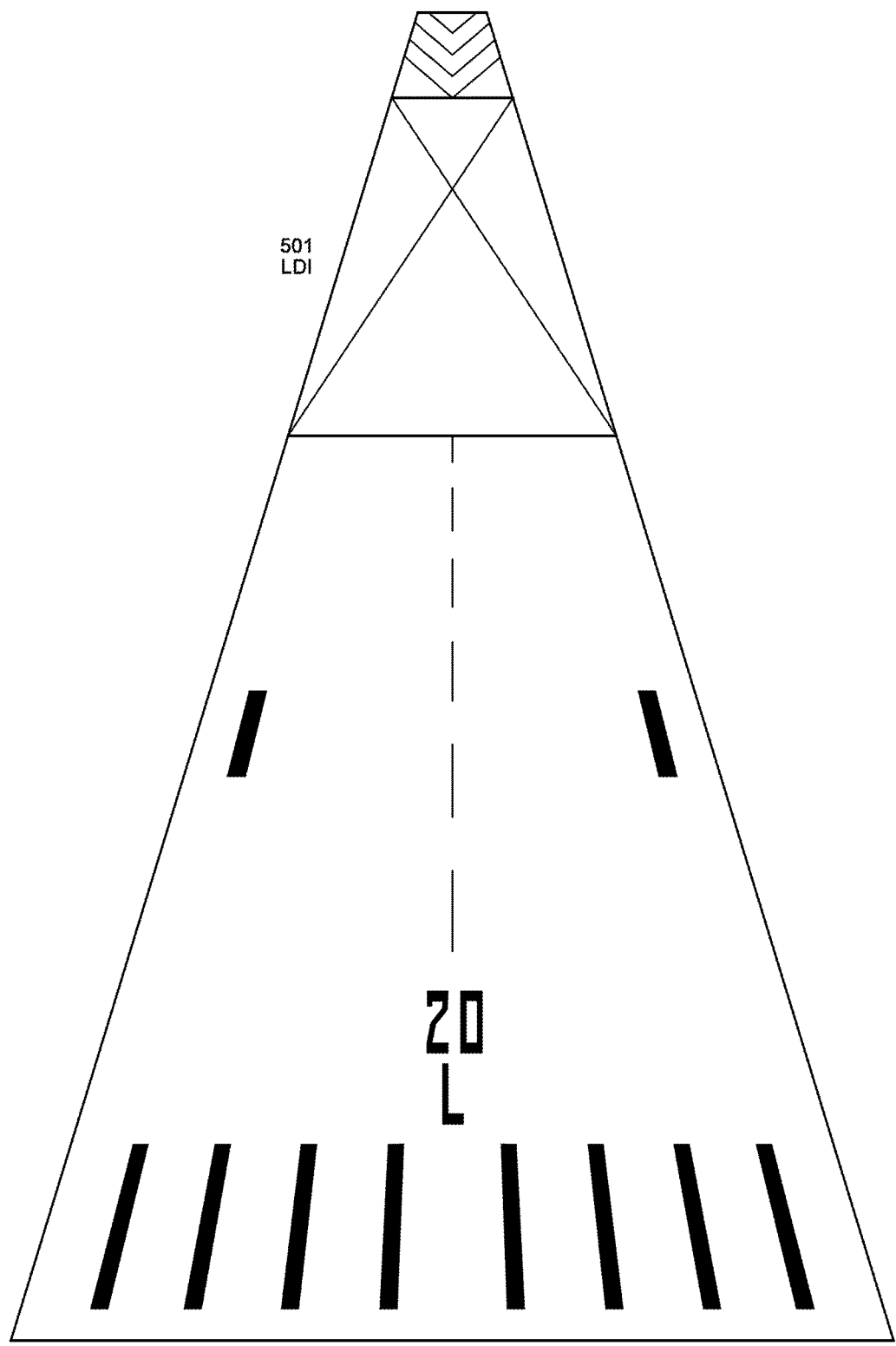
FIG. 7B depicts an exemplary illustration of an LDI shown in an egocentric and located on the surface of a runway with a displaced threshold.

The runway and other non-runway surfaces of FIG. 5A—including the displaced threshold 302 and the blast pad or stopway 304—are assumed to be present in FIGS. 7A through 7H. Referring now to FIG. 7A, an LDI 501 for Runway 20L is illustrated in a plan view, where LDI 501 is located on the runway surface and displayed threshold 302 (blocked from view by LDI 501). The LTP 312 of Runway 2R and the distance of the displaced threshold 302 from the LTP 312 as shown in FIG. 5A may be used to determine the location of a DB of LDI 501 of FIG. 7A, and an LD 502 may be used to determine the location of a PB. Similar to the LD 214 of FIG. 4B, LD 502 of FIG. 7A could be a distance configurable by a manufacturer and/or end-user.

If an ETP indicator is located beyond the PB of LDI 501, the pilot could observe that there is an insufficient amount of landing distance to perform a safe landing. Referring to FIG. 7B, an egocentric presentation of LDI 501 is illustrated.

Figure 7C:
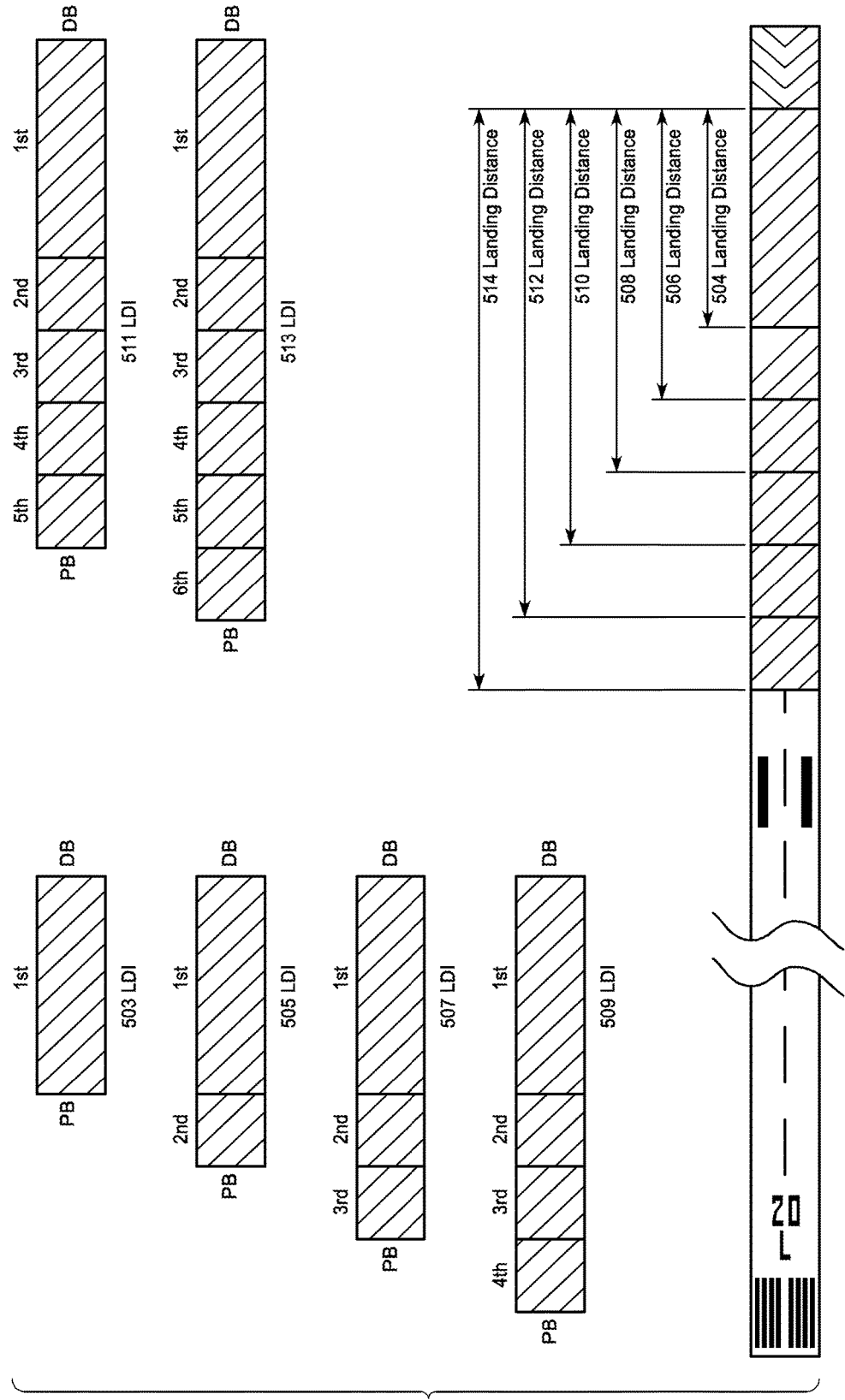
FIG. 7C depicts exemplary illustrations of multiple configurations of an LDI located on the surface of a runway with a displaced threshold.

Referring now to FIG. 7C, one of a plurality of LDIs that could be possible for Runway 20L is illustrated in a plan view on the runway surface and displaced threshold. LTP 312 of Runway 2R and the displaced threshold 302 shown in FIG. 5A may be used to determine the location of distal boundaries of LDIs 503, 505, 507, 509, 511, and 513 of FIG. 7C; and LDs 504, 506, 508, 510, 512, and 514 may be used to determine the locations of proximal boundaries of LDIs 503, 505, 507, 509, 511, and 513, respectively.

As stated above, LDIs in some embodiments could include a plurality of zones defined by LDs corresponding to brake settings. Referring now to FIG. 7C, LDI 505 includes a first zone and a second zone, the former being defined by LD 504 corresponding to the MAX MANUAL setting and the latter as a difference between LD 506 corresponding to the MAX AUTO setting and LD 504. Similarly, LDI 407 includes the first zone, the second zone, and a third zone, the latter being defined as a difference between LD 508 corresponding to the AUTOBRAKE 4 setting and LD 506; LDI 509 includes the first zone, the second zone, the third zone, and a fourth zone, the latter being defined as a difference between LD 510 corresponding to the AUTOBRAKE 3 setting and LD 508; LDI 511 includes the first zone, the second zone, the third zone, the fourth zone, and a fifth zone, the latter being defined as a difference between LD 512 corresponding to the AUTOBRAKE 2 setting and LD 510; and LDI 513 includes the first zone, the second zone, the third zone, the fourth zone, the fifth zone, and a sixth zone, the latter being defined as a difference between LD 514 corresponding to the AUTOBRAKE 1 setting and LD 512.

Figure 7D:
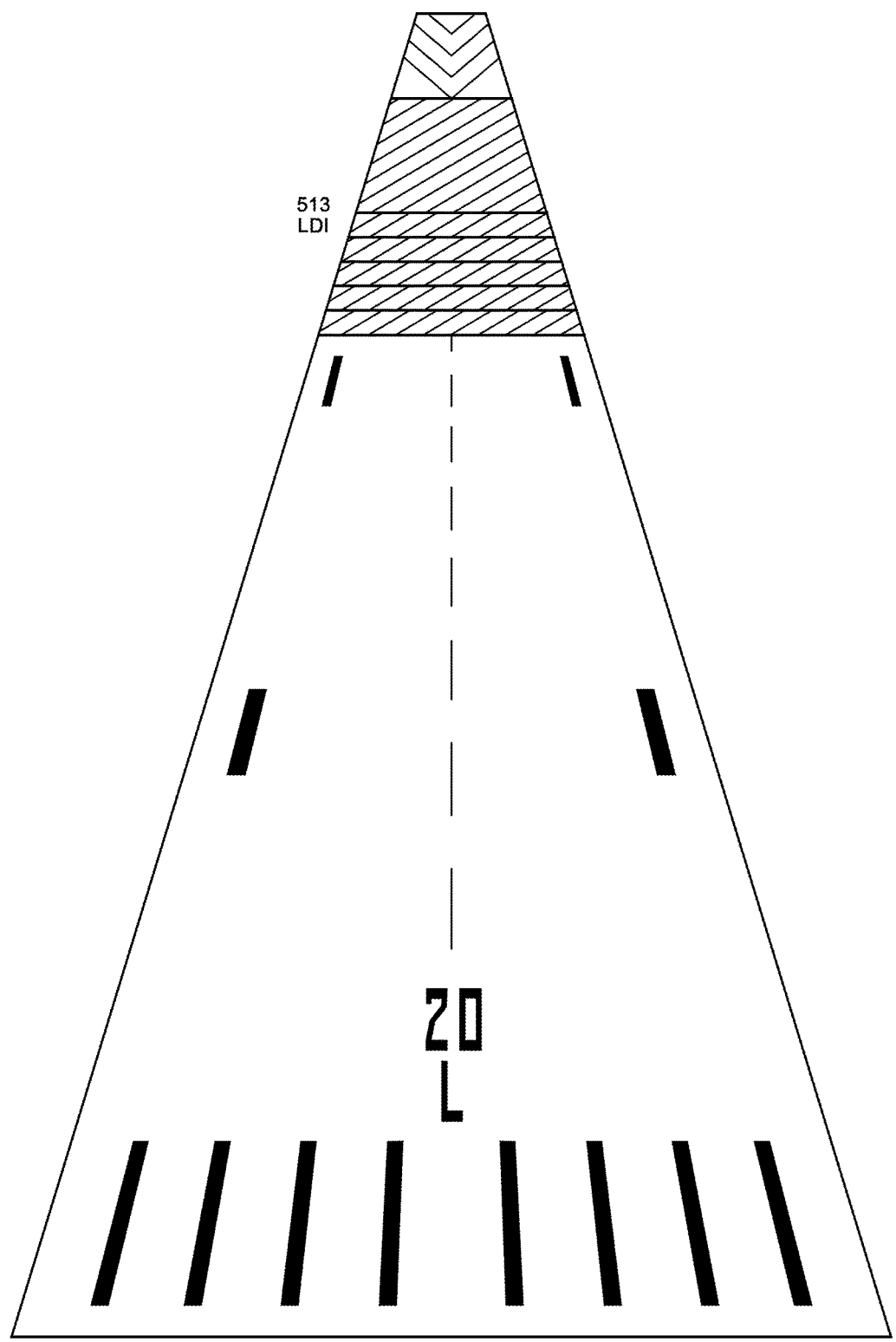
FIG. 7D depicts second exemplary illustrations of multiple configurations of an LDI located on the surface of a runway with a displaced threshold.

If an ETP indicator is located beyond the proximal boundary of an LDI(s), the pilot could observe that there is an insufficient amount of landing distance to perform a safe landing using the specific brake setting(s) corresponding to such LDI(s). Referring to FIG. 7D, an egocentric presentation of LDI 513 is illustrated.

Figure 7E:
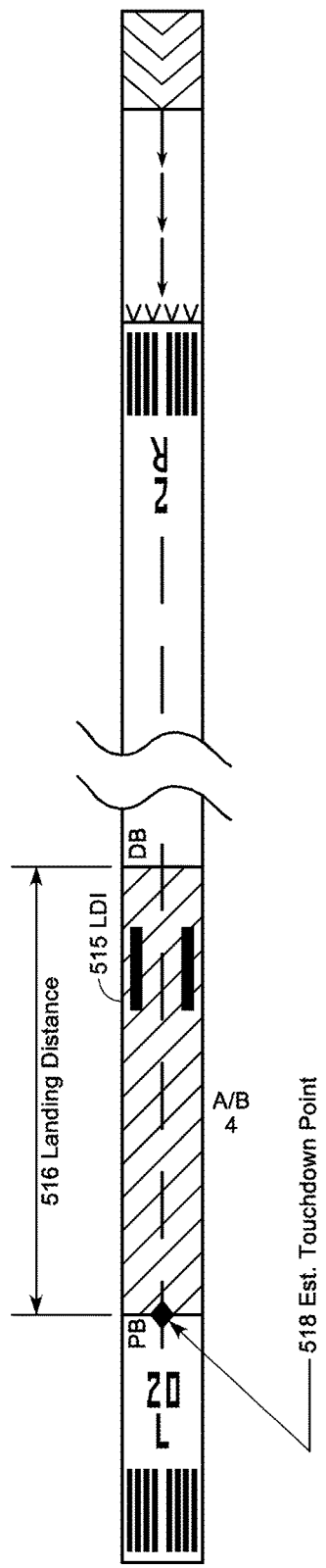
FIG. 7E depicts an exemplary illustration of one configuration of an LDI located on the surface of a runway with a displaced threshold.

Referring now to FIG. 7E, an LDI 515 located on the runway surface is illustrated in a plan view. An ETP 518 for a landing on Runway 20L and an LD 516 may be used to determine the locations of a PB and a DB of LDI 515 as shown. Similar to the LD 214 of FIG. 4B, LD 516 of FIG. 7E could be a distance configurable by a manufacturer and/or end-user.

Figure 7F:
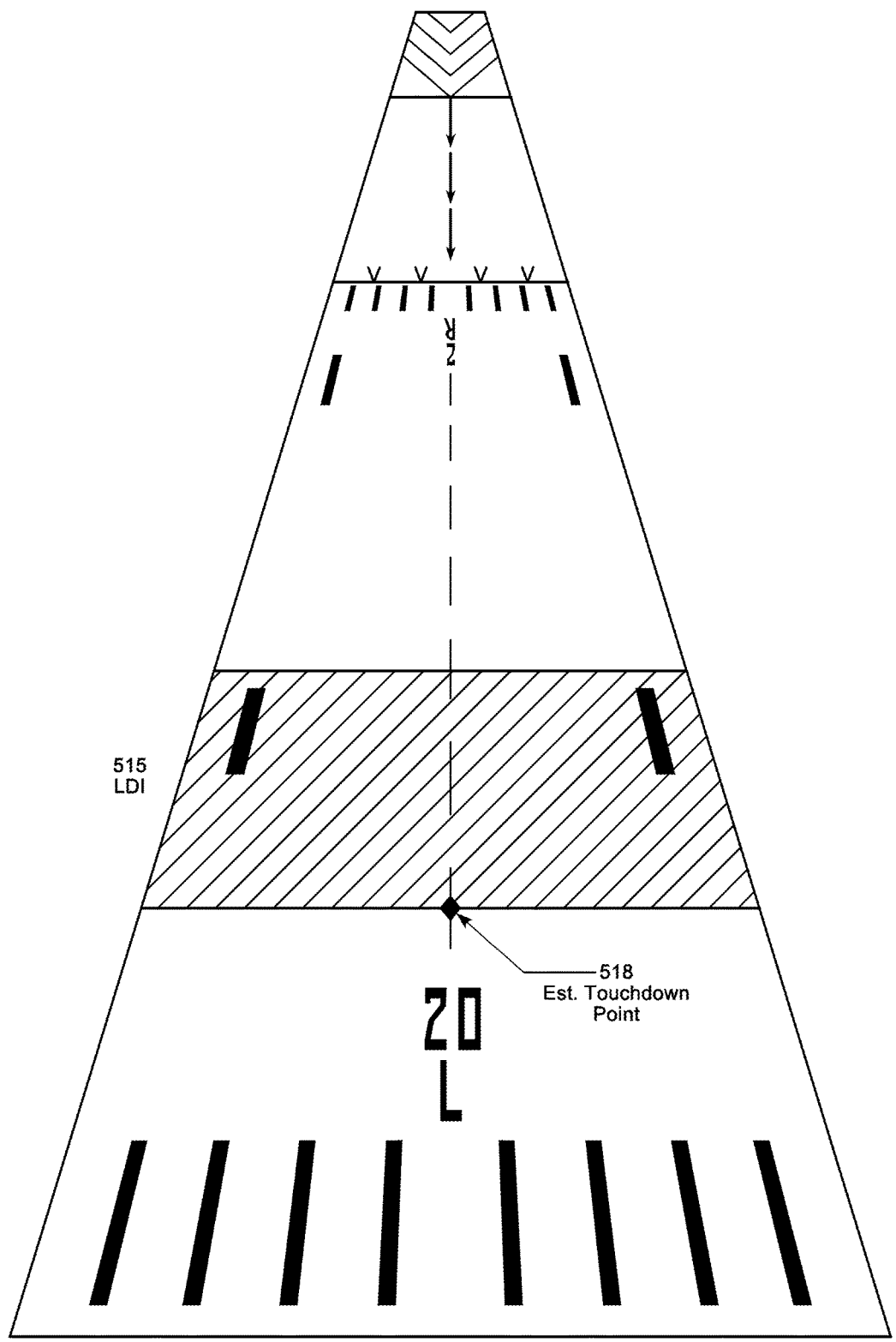
FIG. 7F depicts a second exemplary illustration of one configuration of an LDI located on the surface of a runway with a displaced threshold.

As the aircraft approaches the runway to land, LDI 515 may move with movement of the ETP 518. If at least a part of LDI 515 goes beyond the displaced threshold, the pilot could observe that there is an insufficient amount of landing distance to perform a safe landing. Referring now to FIG. 7F, an egocentric presentation of the LDI 515 is illustrated.

Figure 7G:
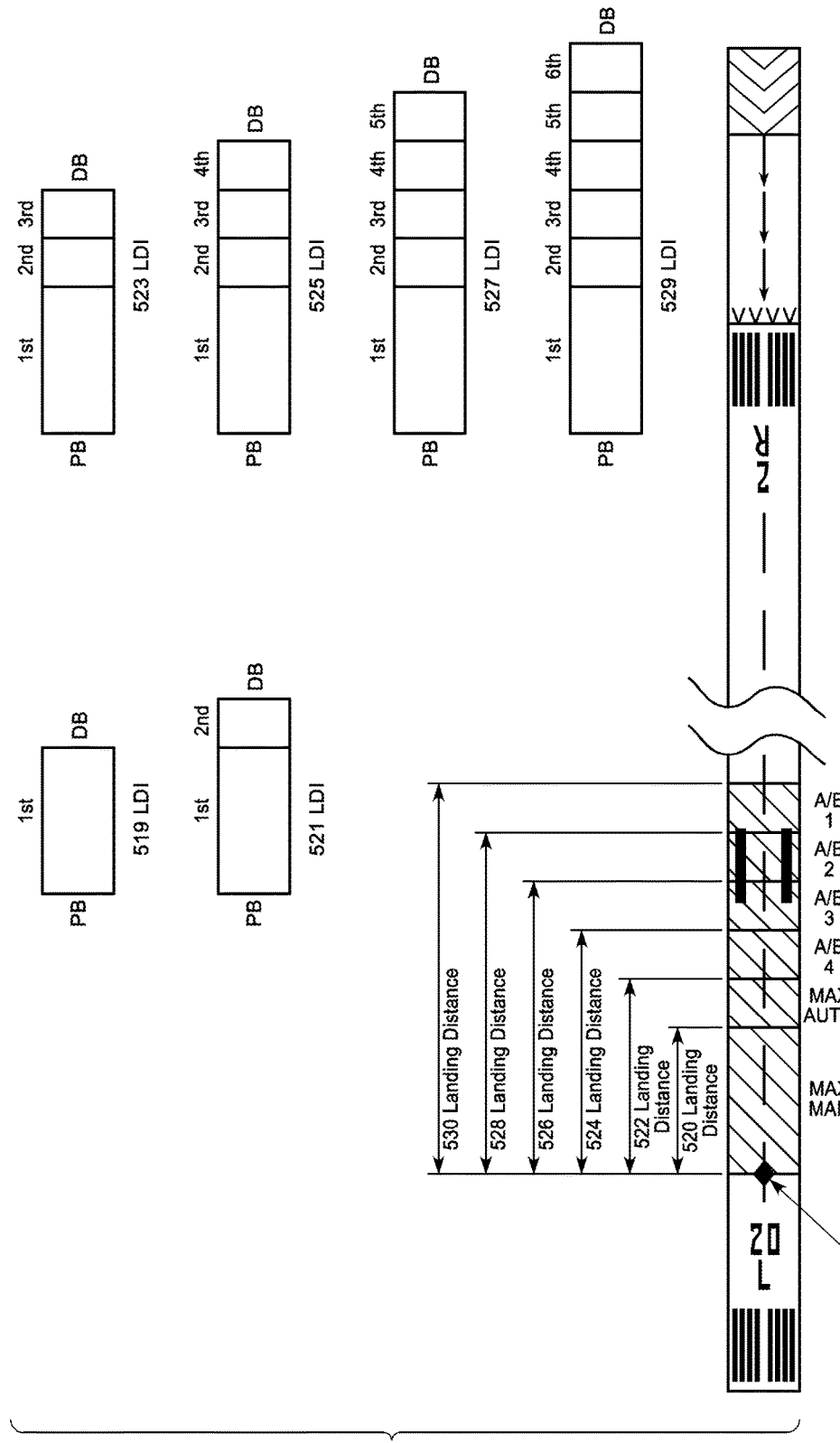
FIG. 7G depicts third exemplary illustrations of multiple configurations of an LDI located on the surface of a runway with a displaced threshold.

Referring now to FIG. 7G, one of a plurality of LDIs that could be possible for the landing runway is illustrated on the runway surface in a plan view. The ETP 518 and LDs 520, 522, 524, 526, 528, and 530 may be used to determine the locations of proximal and distal boundaries of LDIs 519, 521, 523, 525, 527, and 529 as shown. Similar to the LDs of FIG. 4D, LDs 520, 522, 524, 526, 528, and 530 of FIG. 7G could correspond to possible brake settings selectable by the pilot.

As stated above, LDIs in some embodiments could include a plurality of zones defined by LDs corresponding to brake settings. Referring now to FIG. 7G, LDI 521 includes a first zone and a second zone, the former being defined by LD 520 corresponding to the MAX MANUAL setting and the latter as a difference between LD 522 corresponding to the MAX AUTO setting and LD 520. Similarly, LDI 523 includes the first zone, the second zone, and a third zone, the latter being defined as a difference between LD 524 corresponding to the AUTOBRAKE 4 setting and LD 522; LDI 525 includes the first zone, the second zone, the third zone, and a fourth zone, the latter being defined as a difference between LD 526 corresponding to the AUTOBRAKE 3 setting and LD 524; LDI 527 includes the first zone, the second zone, the third zone, the fourth zone, and a fifth zone, the latter being defined as a difference between LD 528 corresponding to the AUTOBRAKE 2 setting and LD 526; and LDI 529 includes the first zone, the second zone, the third zone, the fourth zone, the fifth zone, and a sixth zone, the latter being defined as a difference between LD 530 corresponding to the AUTOBRAKE 1 setting and LD 528.

Figure 7H:
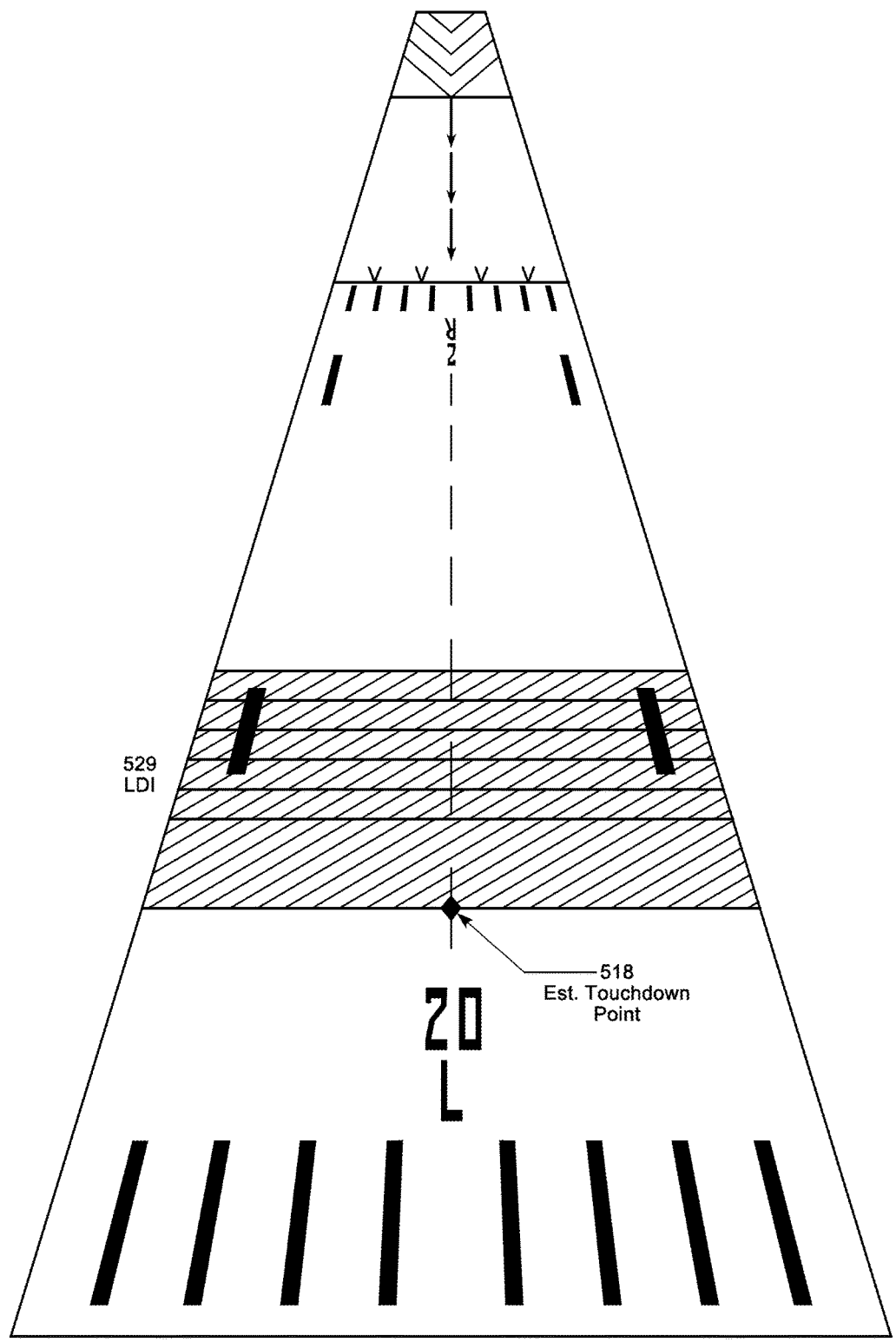
FIG. 7H depicts fourth exemplary illustrations of multiple configurations of an LDI located on the surface of a runway with a displaced threshold.

As the aircraft approaches the runway to land, LDIs 519, 521, 523, 525, 527, and 529 may move with movement of the ETP 518. If at least a part of LDI(s) goes beyond the displaced threshold, the pilot could observe that there is an insufficient amount of landing distance to perform a safe landing using the specific brake setting(s) corresponding to such LDI(s). Referring now to FIG. 7H, an egocentric presentation of the LDI 529 is illustrated.

Figure 8:
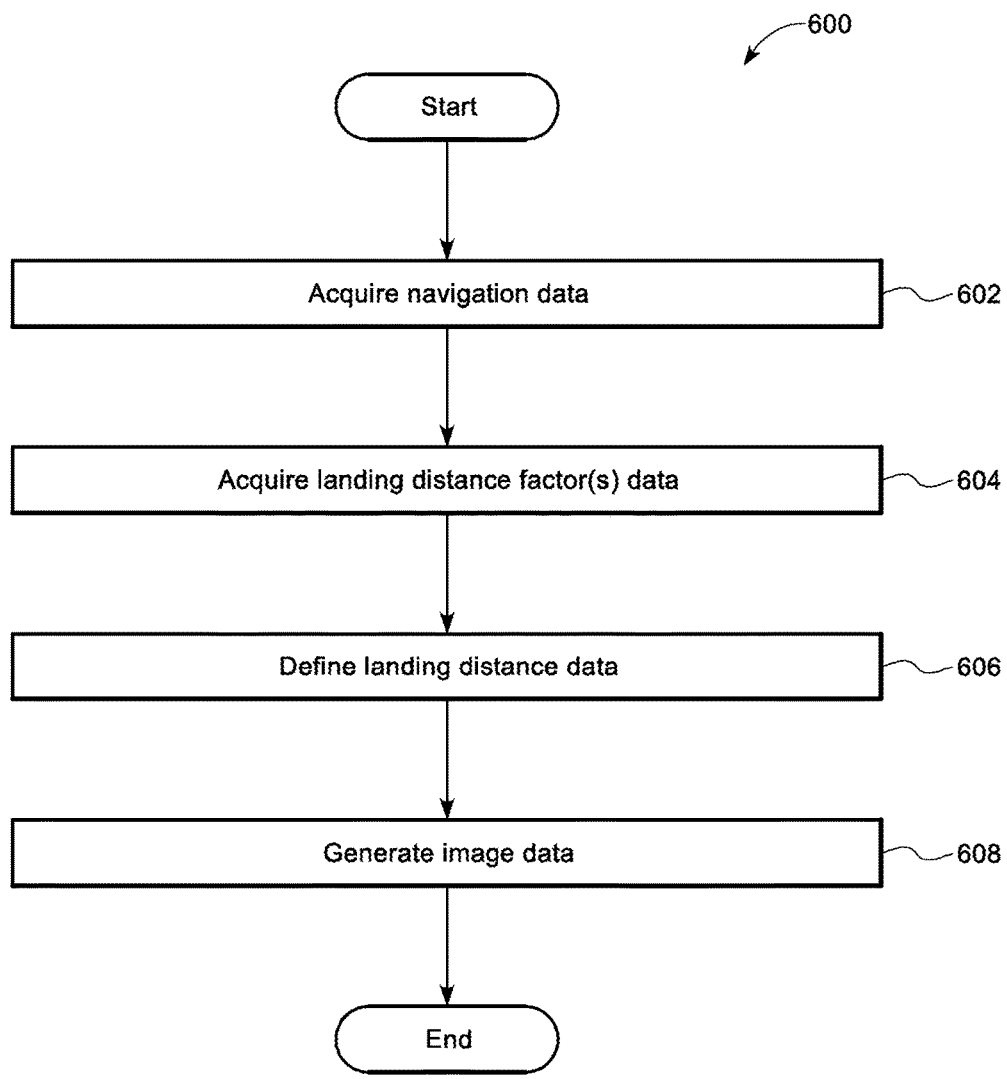
FIG. 8 illustrates a flowchart disclosing an embodiment of a method for generating an aircraft LDI.

FIG. 8 depicts flowchart 600 providing an example for generating an LDI, where the IG 140 may be programmed or configured with instructions corresponding to the following modules that that are continuously executed throughout the aircraft operation. The IG 140 may be a processing unit(s) of a module such as, but not limited to, a printed circuit card assembly having one or more input interfaces (e.g., virtual or physical computer ports) to facilitate data communications with the IG 140, i.e., the receiving and providing of data (e.g., one or more electrical or optical signals including data and/or being indicative of data). For the accomplishment of the following modules embodied in FIG. 8, the acquiring of data is synonymous and/or interchangeable with reading, receiving, and/or the retrieval of data.

The method of flowchart 600 begins with module 602 with the IG 140 acquiring navigation data representative of information corresponding to at least aircraft position, direction of flight, an identification of a runway of intended landing, and a runway reference point from a navigation data source 110. In some embodiments, the RRP could include LTP information of the runway opposite of the runway of intended landing. In some embodiments, the information could correspond to a demarcation bar of a displaced threshold of a runway opposite to the runway of intended landing. In some embodiments, the RRP could include ETP information.

The method of flowchart 600 continues with module 604 with the IG 140 acquiring data representative of one or more LDFs from one or more LDF data sources 120. In some embodiments, the LDFs data source 120 could include the navigation data source 110.

The method of flowchart 600 continues with module 606 with the IG 140 defining LD data representative of an LD. In some embodiments, the LD may be defined by acquiring LD information from the LD data source 130, where the acquisition could be based upon one or more LDFs. In some embodiments, the LD may be defined from an LD algorithm (s) known to those skilled in the art that applies one or more LDFs. In some embodiments, the LD may be defined from a default LD.

The method of flowchart 600 continues with module 608 with the IG 140 generating image data, where the image data may be generated as a function of the LD data. The image data could be representative of an LDI shown in FIGS. 4B through 4I and FIGS. 5B through 7H that is presentable to a viewer via the presentation system 150. In some embodiments, the LDI could be comprised of a first boundary and a second boundary, where the location of the first boundary is based upon the location of the RRP.

In some embodiments in which the RRP may be an LTP of module 602, the location of the first boundary (e.g., distal boundary) could be based upon the location of the LTP. The image data could include alert data representative of a first alert (e.g., caution alert) or a second alert (e.g., warning alert); the first alert could be based upon a configurable distance between the ETP and second boundary (e.g., proximal boundary) for the ETP located prior to the second boundary, and the second alert could be based upon an ETP located past the second boundary.

In some embodiments in which the RRP may be an LTP of module 602, the location of the first boundary (e.g., distal boundary) could be based upon the location of the LTP. The image data could include alert data representative of a first alert (e.g., caution alert) or a second alert (e.g., warning alert); the first alert could be based upon a configurable distance between the ETP and second boundary (e.g., proximal boundary) for the ETP located prior to the second boundary, and the second alert could be based upon an ETP located past the second boundary.

In some embodiments in which the RRP may be an ETP of module 602, the location of the first boundary (e.g., proximal boundary) could be based upon the location of the ETP. The image data could include alert data representative of a first alert or a second alert; the first alert could be based upon a configurable distance between the LTP or demarcation bar of module 602, and second boundary (e.g., distal boundary) for the second boundary located prior to the LTP of demarcation bar, and the second alert could be based upon the second boundary located past the LTP or demarcation bar. Then, the method of flowchart 600 ends.

It should be noted that the method steps described above may be embodied in computer-readable media stored in a non-transitory computer-readable medium as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all modifications, permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations, enhancements, equivalents, and improvements falling within the true spirit and scope of the present invention.

What is claimed is:

1. A system for generating a landing distance indicator, comprising:
   at least one source of navigation data;
   at least one source of factor data; and
   an image generator configured to:
      acquire navigation data representative of at least an aircraft position, a direction of flight, a runway of intended landing, and a runway reference point;
      acquire factor data representative of at least one factor affecting a landing distance;
      define distance data representative of the landing distance as a function the factor data; and
      generate image data as a function of a location of the runway reference point and the landing distance, where
         the image data is representative of at least an image of the landing distance indicator presentable to a viewer and comprised of a plurality of boundaries, where
            a location of a first boundary is based upon the location of the runway reference point, and
            a location of a second boundary is based upon the runway reference point and the landing distance.

2. The system of claim 1, wherein at least one source of navigation data and at least one source of factor data are the same source.

3. The system of claim 1, further comprising:
   a source of publication data, where
      the image generator is further configured to:
         acquire publication data representative of at least one published landing distance as a function the factor data, where
         the distance data is defined from the publication data.

4. The system of claim 1, wherein
   one factor affecting a landing distance is comprised of a brake setting, where
      the landing distance indicator is comprised of at least one zone, such that the size of each zone is dependent upon the brake setting.

5. The system of claim 1, wherein the location of the runway reference point is based upon at least a landing threshold point of a runway opposite of the runway of intended landing.

6. The system of claim 5, wherein
   the navigation data is further representative of an estimated touchdown point, and
   the function for generating the image data includes a location of the estimated touchdown point, such that the image includes
      an estimated touchdown point indicator, and
      an alert when the estimated touchdown point indicator is located past the second boundary.

7. The system of claim 1, wherein the runway reference point is based upon an estimated touchdown point.

8. The system of claim 7, wherein
the navigation data is further representative of a second runway reference point, such that
the image includes
an estimated touchdown point indicator, and
an alert when the second boundary is located past second runway reference point.

9. A device for generating a landing distance indicator, comprising:
an image generator configured to:
acquire navigation data representative of at least an aircraft position, a direction of flight, a runway of intended landing, and a runway reference point;
acquire factor data representative of at least one factor affecting a landing distance;
define distance data representative of the landing distance as a function the factor data; and
generate image data as a function of a location of the runway reference point and the landing distance, where
the image data is representative of at least an image of the landing distance indicator presentable to a viewer and comprised of a plurality of boundaries, where
a location of a first boundary is based upon the location of the runway reference point, and
a location of a second boundary is based upon the runway reference point and the landing distance.

10. The device of claim 9, wherein
one factor affecting a landing distance is comprised of a brake setting, where
the landing distance indicator is comprised of at least one zone, such that the size of each zone is dependent upon the brake setting.

11. The device of claim 9, wherein the location of the runway reference point is based upon at least a landing threshold point of a runway opposite of the runway of intended landing.

12. The device of claim 11, wherein
the navigation data is further representative of an estimated touchdown point, and
the function for generating the image data includes a location of the estimated touchdown point, such that
the image includes
an estimated touchdown point indicator, and
an alert when the estimated touchdown point indicator is located past the second boundary.

13. The device of claim 9, wherein the runway reference point is based upon an estimated touchdown point.

14. The device of claim 13, wherein
the navigation data is further representative of a second runway reference point, such that
the image includes
an estimated touchdown point indicator, and
an alert when the second boundary is located past second runway reference point.

15. A method for generating a landing distance indicator, comprising:
acquiring navigation data representative of at least an aircraft position, a direction of flight, a runway of intended landing, and a runway reference point;
acquiring factor data representative of at least one factor affecting a landing distance;
defining distance data representative of the landing distance as a function the factor data; and
generating image data as a function of a location of the runway reference point and the landing distance, where
the image data is representative of at least an image of the landing distance indicator presentable to a viewer and comprised of a plurality of boundaries, where
a location of a first boundary is based upon the location of the runway reference point, and
a location of a second boundary is based upon the runway reference point and the landing distance.

16. The method of claim 15, wherein
one factor affecting a landing distance is comprised of a brake setting, where
the landing distance indicator is comprised of at least one zone, such that the size of each zone is dependent upon the brake setting.

17. The method of claim 15, wherein the location of the runway reference point is based upon at least a landing threshold point of a runway opposite of the runway of intended landing.

18. The method of claim 17, wherein
the navigation data is further representative of an estimated touchdown point, and
the function for generating the image data includes a location of the estimated touchdown point, such that
the image includes
an estimated touchdown point indicator, and
an alert when the estimated touchdown point indicator is located past the second boundary.

19. The method of claim 15, wherein the runway reference point is based upon an estimated touchdown point.

20. The method of claim 19, wherein
the navigation data is further representative of a second runway reference point, such that
the image includes
an estimated touchdown point indicator, and
an alert when the second boundary is located past second runway reference point.

* * * * *